(12) United States Patent
Oki et al.

(10) Patent No.: US 6,801,393 B2
(45) Date of Patent: Oct. 5, 2004

(54) THIN-FILM MAGNETIC HEAD HAVING METAL FILM FORMED ON GAP-DEPTH DEFINING LAYER, AND PRODUCTION METHOD THEREFOR

(75) Inventors: Naruaki Oki, Niigata-ken (JP); Sumihito Morita, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 332 days.

(21) Appl. No.: 10/071,959

(22) Filed: Feb. 5, 2002

(65) Prior Publication Data

US 2002/0105757 A1 Aug. 8, 2002

(30) Foreign Application Priority Data

Feb. 6, 2001 (JP) ........................................ 2001-029407

(51) Int. Cl.[7] .............................................. G11B 5/147
(52) U.S. Cl. ..................................................... 360/126
(58) Field of Search ......................................... 360/126

(56) References Cited

U.S. PATENT DOCUMENTS

| | | |
|---|---|---|
| 4,819,112 A | 4/1989 | Iwata et al. |
| 5,828,533 A | 10/1998 | Ohashi et al. |
| 6,130,805 A | 10/2000 | Sasaki et al. |
| 6,134,080 A | 10/2000 | Chang et al. |
| 6,172,848 B1 * | 1/2001 | Santini ........................ 360/126 |
| 6,657,816 B1 * | 12/2003 | Barr et al. .................. 360/126 |

* cited by examiner

*Primary Examiner*—Robert S. Tupper
(74) *Attorney, Agent, or Firm*—Brinks Hofer Gilson & Lione

(57) ABSTRACT

A metal film is formed on the upper surface of a gap-depth defining layer. This makes it possible to form an upper magnetic layer with a predetermined thickness over a gap layer and the metal film by plating, and to produce a thin-film magnetic head which can reduce the magnetic saturation. The positions of a rear edge of the upper magnetic layer or the like, which contributes to the characteristics, such as overwriting characteristics, can be easily and freely changed in order to optimize the characteristics, and the controllability of the track width can be enhanced.

22 Claims, 25 Drawing Sheets

THIN-FILM MAGNETIC HEAD HAVING METAL FILM FORMED ON GAP-DEPTH DEFINING LAYER, AND PRODUCTION METHOD THEREFOR

BACKGROUND OF THE INVENTION

1. Field of the Invention

The present invention relates to a thin-film magnetic head for recording which is suitable for, for example, a flying magnetic head and a contact magnetic head. More particularly, the present invention relates to a thin-film magnetic head which can produce a large magnetic field adjacent to the gap by properly preventing magnetic saturation in an upper magnetic layer, can enhance various characteristics, such as overwriting characteristics, and can enhance the controllability of the track width, and relates to a production method for the thin-film magnetic head.

2. Description of the Related Art

FIG. 30 is a partial front view showing the structure of a thin-film magnetic head (inductive head) as a related art, and FIG. 31 is a partial longitudinal sectional view of the thin-film magnetic head, taken along line XXXI—XXXI in FIG. 30 and viewed from the direction of the arrows.

Referring to FIGS. 30 and 31, a lower core layer 1 is made of a magnetic material, such as permalloy, and an insulating layer 9 is formed thereon.

The insulating layer 9 has a groove 9a which extends from a surface opposing a recording medium (recording-medium opposing surface) in the height direction (Y-direction in the figure) and has an inner width in the track width direction (X-direction) equal to the track width Tw.

A lower magnetic layer 3 which is magnetically connected to the lower core layer 1, a gap layer 4, and an upper magnetic layer 5 which is magnetically connected to an upper core layer 6 are formed by plating, and are stacked from the bottom in that order inside the groove 9a.

As shown in FIG. 30, the upper core layer 6 is formed on the upper magnetic layer 5 by plating.

As shown in FIG. 31, a coil layer 7 is formed in a spiral pattern on a portion of the insulating layer 9 offset from the groove 9a in the height direction (Y-direction).

The coil layer 7 is covered with a coil insulating layer 8 made of a resist or the like, and the upper core layer 6 is placed on the coil insulating layer 8. The upper core layer 6 is magnetically connected to the upper magnetic layer 5 at a leading end portion 6a, and to the lower core layer 1 at a base end portion 6b.

In the inductive head shown in FIGS. 30 and 31, when a recording current is applied to the coil layer 7, a recording magnetic field is induced in the lower core layer and the upper core layer 6, and a magnetic signal is recorded on a recording medium, such as a hard disk, by a leakage field produced between the lower magnetic layer 3 magnetically connected to the lower core layer 1 and the upper magnetic layer 5 magnetically connected to the upper core layer 6.

The above-described thin-film magnetic head has the following disadvantages.

That is, the lengths between the recording-medium opposing surfaces and the rear end faces in the height direction of the lower magnetic layer 3, the gap layer 4, and the upper magnetic layer 5 are all set to T1. The length T1 is called the gap depth (Gd). In the thin-film magnetic head of the related art, it is necessary to minimize T1 in order to increase the leakage magnetic flux from the gap layer 4.

As the gap depth decreases, the area of the joint surface between the upper core layer 6 and the upper magnetic layer 5 also decreases. Therefore, the magnetic flux flowing through the upper core layer 6 is condensed, and magnetic saturation occurs before the magnetic flux reaches the gap layer 4. That is, a leakage magnetic flux is also produced in the portions spaced from the gap layer 4. In particular, when the recording frequency is increased, precise recording is impossible.

Accordingly, the thin-film magnetic head has been improved, as shown in, for example, FIG. 32. FIG. 32 is a longitudinal sectional view of an improved thin-film magnetic head.

In the thin-film magnetic head shown in FIG. 32, a gap-depth defining layer 10 made of, for example, an organic insulating material is formed on a portion of a lower core layer 1 at a predetermined distance from a recording-medium opposing surface in the height direction.

A lower magnetic layer 3, a gap layer 4, and an upper magnetic layer 5 are stacked from the bottom in that order between the recording-medium opposing surface and the gap-depth defining layer 10. In FIG. 32, the gap depth (Gd) is defined by the length T2 from the recording-medium opposing surface to the position where the gap layer 4 and the gap-depth defining layer 10 contact each other, and can be easily optimized by changing the position of the gap-depth defining layer 10. Moreover, since the upper magnetic layer 5 can be made longer than the gap depth by being extended onto the gap-depth defining layer 10, the contact area between the upper magnetic layer 5 and an upper core layer 6 can be increased, regardless of the gap depth. This makes it possible to properly reduce the magnetic saturation in the upper magnetic layer 5 even when the recording density increases in future.

In order to further increase the recording density, it is necessary to increase the leakage field adjacent to the gap. For that purpose, it is preferable that the upper magnetic layer 5 have a multilayered structure composed of two or more magnetic layers, that a lower layer of the magnetic layers in contact with the gap layer 4 be formed of a high-Bs layer having a high saturation magnetic flux density Bs, and that an upper layer having a lower saturation magnetic flux density Bs than that of the high-Bs layer be formed on the high-Bs layer.

FIG. 33 is a process view of the thin-film magnetic head shown in FIG. 32. The gap-depth defining layer 10 is formed on the lower core layer 1, and the lower magnetic layer 3 and the gap layer 4 are formed on a portion of the lower core layer 1 disposed in front of the gap-depth defining layer 10 by plating. The upper magnetic layer 5 is then formed on the gap layer 4 by plating. In this case, however, a lower layer 11 of the upper magnetic layer 5 having a high saturation magnetic flux density cannot be suitably formed so as to extend onto the gap-depth defining layer 10.

This is because the gap-depth defining layer 10 is an insulating layer made of an organic insulating material or the like. Even when the lower layer 11 is formed on the gap-depth defining layer 10, the thickness thereof is much less than when formed on the gap layer 4.

An upper layer 12 formed on the lower layer 11 by plating is, of course, not easily formed on the gap-depth defining layer 10, and the thickness thereof on the gap-depth defining layer 10 is small. For this reason, the upper magnetic layer 5 formed on the gap-depth defining layer 10 is extremely thin.

In the subsequent step, the upper magnetic layer 5 is ground to line C—C in order to flatten the upper surface thereof. When the thickness of the upper magnetic layer 5 at the rear end is small, as described above, the volume is substantially reduced by the grinding step, and the upper magnetic layer 5 is prone to cause magnetic saturation.

For example, when the upper magnetic layer 5 is ground to line C'—C', a recess 5c is sometimes formed or the upper magnetic layer 5 itself is not formed at the rear end, depending on the accuracy of the flattening.

Since the lower layer 11 having a high saturation magnetic flux density formed on the gap-depth defining layer 10 is extremely thin, as described above, a magnetic flux flowing from the upper core layer 6 to the upper magnetic layer 5 is not properly guided to the lower layer 11, that is, the flow efficiency of the magnetic flux to the lower layer 11 declines. For this reason, the upper magnetic layer 5 is prone to cause magnetic saturation, and the leakage field adjacent to the gap layer 4 cannot be increased. As a result, it is impossible to produce a thin-film magnetic head which can suitably respond to future increases in recording density.

FIG. 34 is a partial plan view of the upper magnetic layer 5. The upper magnetic layer 5 is composed of a front area 5a having a width in the track width direction (X-direction in the figure) at the recording-medium opposing surface equal to the track width Tw, and a rear area 5b formed at the rear end of the front area 5a so as to gradually increase in width.

The position of a rear edge (magnetic pole edge) 5b1 of the upper magnetic layer 5 principally contributes to the overwriting characteristics, and the position of an end portion 5a, from which the width increases, principally contributes to NLTS (non-linear transition shift) and the pulse width at the 50% threshold.

As shown in FIG. 33, however, when the upper magnetic layer 5 is formed, the lower layer 11 having a high saturation magnetic density is not formed on the gap-depth defining layer 10, or the thickness of the lower layer 11 formed thereon is extremely small. The upper layer 12 formed on the lower layer 11 on the gap-depth defining layer 10 by plating is also thin. Since the upper magnetic layer 5 is thin on the rear side, and it is difficult to ensure a predetermined thickness, the positions of the rear edge 5b1 and the end portion 5a1 of the upper magnetic layer 5 are limited in order to achieve predetermined overwriting characteristics, NLTS, and pulse width at the 50% threshold. This decreases the degree of flexibility in designing the positions of the rear edge 5b1 and the end portion 5a1.

A thin-film magnetic head having the structure shown in FIG. 35 has also been proposed. FIG. 35 is a partially enlarged longitudinal sectional view showing only the portions near the recording-medium opposing surface. In the thin-film magnetic head shown in FIG. 35, a lower magnetic layer 3 is formed on a lower core layer 1 by grinding the lower core layer 1 so as to form a step. A gap layer 13 is placed on the lower magnetic layer 3. The gap layer 13 is made of an insulating material, such as $Al_2O_3$ or $SiO_2$. A gap-depth defining layer 10 is formed on the gap layer 13 at a predetermined distance from the recording-medium opposing surface. The gap depth is determined by limiting the rear end in the height direction of the joint portion between the gap layer 13 and an upper magnetic layer 5 by a front end face of the gap-depth defining layer 10 on the side of the recording-medium opposing surface. In FIG. 35, the gap depth is designated by L3.

The upper magnetic layer 5 is formed on the front end face of the gap-depth defining layer 10 and on a portion of the gap layer 13 between the gap-depth defining layer 10 and the recording-medium opposing surface with a seed layer 5d therebetween. The upper magnetic layer 5 is magnetically connected to an upper core layer 6 on the upper surface thereof.

In this thin-film magnetic head, since the lower magnetic layer 3 is formed by grinding the lower core layer 1 by, for example, ion milling, magnetic powder due to the grinding adheres onto both side faces in the track width direction (X-direction) of the upper magnetic layer 5. The track width Tw determined by the width in the track width direction of the upper magnetic layer 5 is increased due to the adhering magnetic powder, and this makes it difficult to produce a thin-film magnetic head which can achieve a narrower track width.

In order to remove the magnetic powder, the upper magnetic layer 5 must be subjected to ion milling from both side directions. This complicates the production process, and the height of the upper magnetic layer 5 is reduced by ion milling. As a result, it is difficult to properly remove the magnetic powder, and the controllability of the track width is substantially reduced.

SUMMARY OF THE INVENTION

Accordingly, the present invention aims to overcome the above problems in the related art, and an object of the invention is to provide a thin-film magnetic head which can produce an appropriate magnetic field adjacent to the gap by properly preventing magnetic saturation in an upper magnetic layer, can enhance various characteristics, such as overwriting characteristics, and can enhance the controllability of the track width, and to provide a production method for the thin-film magnetic head.

In order to achieve the above object, according to an aspect of the present invention, there is provided a thin-film magnetic head including a lower core layer; a magnetic pole section having a lower magnetic layer, a gap layer, and an upper magnetic layer stacked in that order on the lower core layer, the upper magnetic layer having a width in the track width direction less than that of the lower core layer so as to determine the track width; and an upper core layer formed on the upper magnetic layer, wherein a gap-depth defining layer is formed on a portion of the lower core layer behind a surface opposing a recording medium in the height direction, the lower magnetic layer extends from the opposing surface to a front end face of the gap-depth defining layer on the side of the opposing surface, a metal film is formed on a portion of the gap-depth defining layer disposed behind a contact face between the lower magnetic layer and the gap-depth defining layer in the height direction, the gap layer is formed on the lower magnetic layer so as to be in contact with at least the gap-depth defining layer, and the upper magnetic layer extends over the gap layer and the metal film.

In the thin-film magnetic head, the metal film is formed on a part of the upper surface of the gap-depth defining layer. The lower magnetic layer is formed on the lower core layer so as to extend between the opposing surface and the front end face of the gap-depth defining layer, and not to extend onto the metal film which is formed on the upper surface of the gap-depth defining layer.

The gap layer is made of a material which can be plated, and the gap layer and the metal film formed on the gap-depth defining layer serve as a seed layer for the upper magnetic layer which is formed on the gap layer by plating.

For this reason, it is possible to suitably form the upper magnetic layer over the gap layer and the metal film by plating, and to form the upper magnetic layer with a predetermined thickness on the gap-depth defining layer.

Consequently, the contact area between the upper magnetic layer and the upper core layer can be increased, the volume of the upper magnetic layer can be sufficiently increased, and magnetic saturation in the upper magnetic layer can be properly reduced even when the recording density increases in future.

Since the upper magnetic layer having a predetermined thickness can be formed on the metal film disposed on the gap-depth defining layer, the positions of the end portion, from which the width increases in width in the height direction, and the rear edge of the upper magnetic layer on the rear side can be freely designed and changed in order to optimize the overwriting characteristics, NLTS, and the pulse width at the 50% threshold.

Since the rear end of the upper magnetic layer disposed on the gap-depth defining layer have a sufficient volume, the upper magnetic layer can be formed in a predetermined shape without being affected by the accuracy of flattening.

The thin-film magnetic head of the present invention includes the lower magnetic layer, and the lower magnetic layer is not formed by grinding the lower core layer, as shown in FIG. 35. Therefore, it is not necessary to remove magnetic powder adhering onto side faces of the upper magnetic layer in the track width direction, and the controllability of the track width can be made higher than before.

Preferably, the upper magnetic layer has a layered structure composed of two or more magnetic layers, the lowermost layer of the magnetic layers in contact with the gap layer is formed of a high-Bs layer having a higher saturation magnetic density than those of the other magnetic layers, and the high-Bs layer is formed over the gap layer and the metal film.

Since the lowermost layer (high-Bs layer) having a high saturation magnetic flux density is also formed onto the metal film disposed on the gap-depth defining layer, it can be made thick on the gap-depth defining layer. The magnetic flux flowing from the upper core layer to the upper magnetic layer can be properly guided to the high-Bs layer of the upper magnetic layer disposed on the gap-depth defining layer, and the flow efficiency of the magnetic flux can be enhanced. This can increase the leakage magnetic flux adjacent to the gap. As a result, it is possible to produce a thin-film magnetic head which can suitably respond to future increases in recording density.

Preferably, the front end face of the gap-depth defining layer is a curved face or an inclined face which is inclined in the height direction away from the lower core layer toward the upper core layer.

For example, the cross section of the gap-depth defining layer in the height direction is substantially semielliptical or substantially trapezoidal.

The front end face of the gap-depth defining layer may be a vertical face which vertically rises from the lower core layer toward the upper core layer.

Preferably, the gap-depth defining layer is made of an organic material. For example, the gap-depth defining layer is made of a resist material.

The gap-depth defining layer may be made of an inorganic material.

Preferably, the metal film is made of a nonmagnetic metal material. In this case, it is preferable to select as the nonmagnetic metal material at least one of Au, Cu, Cu—Ni, Pt, and Ti.

The metal film may be made of a magnetic metal material. It is preferable to make the metal film of a nonmagnetic metal material rather than of a magnetic metal material. This is because the metal film made of the magnetic metal material may melt when the upper magnetic layer is formed thereon by plating.

Preferably, the metal film made of the nonmagnetic metal material or the magnetic metal material is formed by sputtering. This allows the metal film to be more accurately formed on the gap-depth defining layer.

Preferably, the metal film is formed by placing a nonmagnetic metal film on an underlying film made of the nonmagnetic metal material or the magnetic metal material.

This structure is effective particularly when the gap-depth defining layer is thin. When the gap-depth defining layer is thin, the distance between the upper magnetic layer formed thereon and the lower core layer formed thereunder is reduced, and the magnetic field is prone to leak between the upper magnetic layer and the lower core layer. This reduces the leakage field produced from the surface opposing the recording medium adjacent to the gap.

Since the nonmagnetic metal film is formed by plating, it can be made thick. By forming a thick nonmagnetic metal film formed by plating on the underlying film made of, for example, a nonmagnetic metal material and formed on the gap-depth defining layer by sputtering, an appropriate distance can be ensured between the upper magnetic layer formed on the gap-depth defining layer and the lower core layer formed under the gap-depth defining layer. This can reduce the leakage field between the upper magnetic layer and the lower core layer.

Preferably, the nonmagnetic metal film is made of at least one of NiP, NiPd, NiW, NiMo, Au, Pt. Rh, Pd, Ru, Cr, and Ti. Using these materials makes it possible to suitably form a highly heat-resistant and highly adhesive nonmagnetic metal film.

The magnetic pole section may be composed of two layers, that is, the gap layer and the upper magnetic layer, and the gap layer may be formed on the lower core layer so as to extend between the opposing surface and the front end face of the gap-depth defining layer.

The gap layer may extend from the opposing surface onto at least a part of the metal film formed on the gap-depth defining layer, and the upper magnetic layer may be formed on the gap layer placed on the metal film.

Preferably, the gap layer is made of a nonmagnetic metal material, and at least one of NiP, NiPd, NiW, NiMo, Au, Pt, Rh, Pd, Ru, Cr, and Ti is selected as the nonmagnetic metal material.

According to another aspect of the present invention, there is provided a thin-film magnetic head production method including the steps of: (a) forming a gap-depth defining layer, which has a curved surface and is substantially semielliptical in cross section in the height direction, on a lower core layer at a predetermined distance in the height direction from a surface opposing a recording medium; (b) forming a metal film over the lower core layer and the gap-depth defining layer; (c) covering a portion of the metal film formed on the upper surface of the gap-depth defining layer with a resist layer, and removing the other portion of the metal film which is not covered with the resist layer so that at least a front end face of the gap-depth defining layer on the side of the opposing surface is not covered with the metal film; (d) forming a lower magnetic layer on the lower core layer by plating so as to extend between the opposing surface and the front end face of the gap-depth defining layer; and (e) forming a gap layer on the lower magnetic layer by plating, and then forming an upper magnetic layer over the gap layer and the metal film remaining on the upper surface of the gap-depth defining layer by plating.

Through the above steps, the metal film can be easily and reliably formed on the curved upper surface of the gap-depth defining layer. In the step (d), the lower magnetic layer can be formed by plating so as to extend from the opposing surface to the front end face of the gap-depth defining layer offset from the metal film toward the opposing surface and so as not to extend onto the metal film disposed on the gap-depth defining layer.

In the step (e), after the gap layer is formed on the lower magnetic layer by plating, the upper magnetic layer can be formed over the gap layer and the metal film by plating. Therefore, the upper magnetic layer with a predetermined thickness can be formed on the gap-depth defining layer.

The production method of the present invention may include the following steps, instead of the above steps (b) and (c):

(f) covering portions of the gap-depth defining layer other than an upper surface with a resist layer, and forming a metal film on the upper surface of the gap-depth defining layer which is not covered with the resist layer; and (g) removing the resist layer so that at least a front end face of the gap-depth defining layer on the side of the opposing surface is not covered with the metal film.

These steps also allow the metal film to be suitably and easily formed on the upper surface of the gap-depth defining layer.

The production method of the present invention may include the following steps, instead of the above steps (a) to (c):

(h) forming a gap-depth defining layer over the entire surface of a lower core layer, and forming a metal film on the gap-depth defining layer;

(i) forming a resist layer having a predetermined length in the height direction on a portion of the metal film disposed behind a surface opposing a recording medium in the height direction, and removing the other portion of the metal film which is not covered with the resist layer; and (j) removing the resist layer, and removing a portion of the gap-depth defining layer which is not covered with the metal film by using the metal film as a mask so that the gap-depth defining layer of substantially rectangular or substantially trapezoidal cross section in the height direction remains under the metal film.

The above production method makes it possible to make the cross section of the gap-depth defining layer substantially rectangular or substantially trapezoidal.

The production method of the present invention may include the following steps, instead of the above steps (h) and (i):

(k) forming a gap-depth defining layer over the entire surface of a lower core layer, covering the gap-depth defining layer with a resist layer, and forming a hole having a predetermined length in the height direction in a portion of the gap-depth defining layer disposed behind a surface opposing a recording medium in the height direction; and (l) forming a metal film on a portion of the gap-depth defining layer which is exposed through the hole.

This also makes it possible to easily and suitably form a gap-depth defining layer of substantially rectangular or substantially trapezoidal cross section.

The production method of the present invention may include the following steps, instead of the above steps (a) to (c):

(m) forming a gap-depth defining layer over the entire surface of the lower core layer, and forming an underlying for a metal film on the gap-depth defining layer;

(n) covering the underlying film with a resist layer, forming a hole having a predetermined length in the height direction in a portion of the resist layer disposed behind a surface opposing a recording medium in the height direction, and forming a nonmagnetic metal film on a portion of the underlying film exposed through the hole by plating; and (o) removing the resist layer, and removing portions of the underlying film and the gap-depth defining layer which are not covered with the nonmagnetic metal film so that the underlying film and the gap-depth defining layer of substantially rectangular or substantially trapezoidal cross section in the height direction remain under the nonmagnetic metal film.

In these steps, the metal film can be formed with a two-layer structure composed of the underlying film and the nonmagnetic metal film formed thereon. Since the nonmagnetic metal film can be made thick, the metal film including the nonmagnetic metal film formed by plating is effective in reducing the magnetic field leaking between the upper magnetic layer formed on the gap-depth defining layer and the lower core layer formed under the gap-depth defining layer, in particular, when the gap-depth defining layer is thin.

Preferably, in the above step (e), the upper magnetic layer is formed by plating so as to have a layered structure including two or more magnetic layers, the lowermost layer of the magnetic layers in contact with the gap layer is formed of a high-Bs layer having a higher saturation magnetic flux density than those of the other layers, and the high-Bs layer is formed over the gap layer and the metal film formed on the gap-depth defining layer by plating.

Since the metal film is formed on the upper surface of the gap-depth defining layer, the lowermost layer (high-Bs layer) of the upper magnetic layer having a high saturation magnetic flux density can be suitably and easily formed thereon with a predetermined thickness by plating.

Preferably, the gap-depth defining layer is made of a resist material, and is cured by heat treatment in the above step (a), (h), (k), or (m).

Preferably, the metal film or the underlying film in the above step (b), (f), (h), (l), or (m) is formed by sputtering. This allows the metal film to be suitably formed on the gap-depth defining layer.

Preferably, the nonmagnetic metal film in the above step (n) is made of at least one of nonmagnetic metal materials NiP, NiPd, NiW, NiMo, Au, Pt, Rh, Pd, Ru, Cr, and Ti by plating.

Preferably, the gap layer in the above step (e) is made of at least one of nonmagnetic metal materials NiP, NiPd, NiW, NiMo, Au, Pt, Rh, Pd, Ru, Cr, and Ti by plating.

Further objects, features and advantages of the present invention will become apparent from the following description of the preferred embodiments with reference to the attached drawings.

DESCRIPTION OF THE PREFERRED EMBODIMENTS

Figure 1:
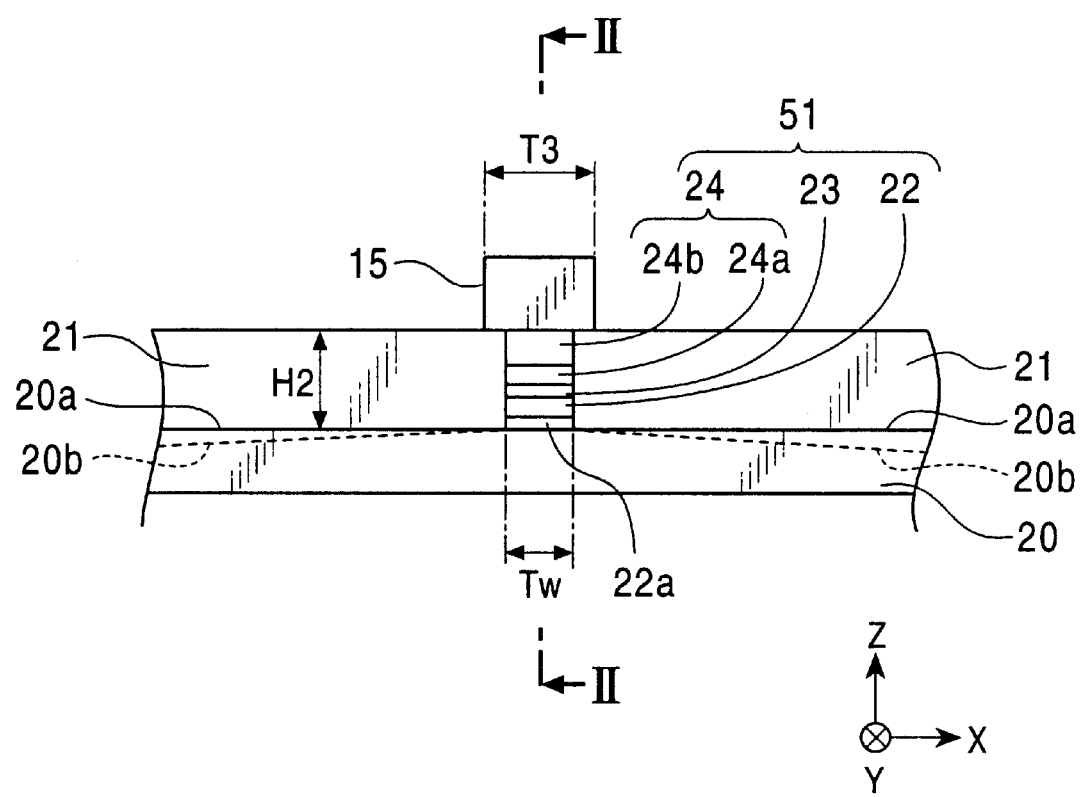
FIG. 1 is a partial front view showing the structure of a thin-film magnetic head according to a first embodiment of the present invention.
Figure 2:
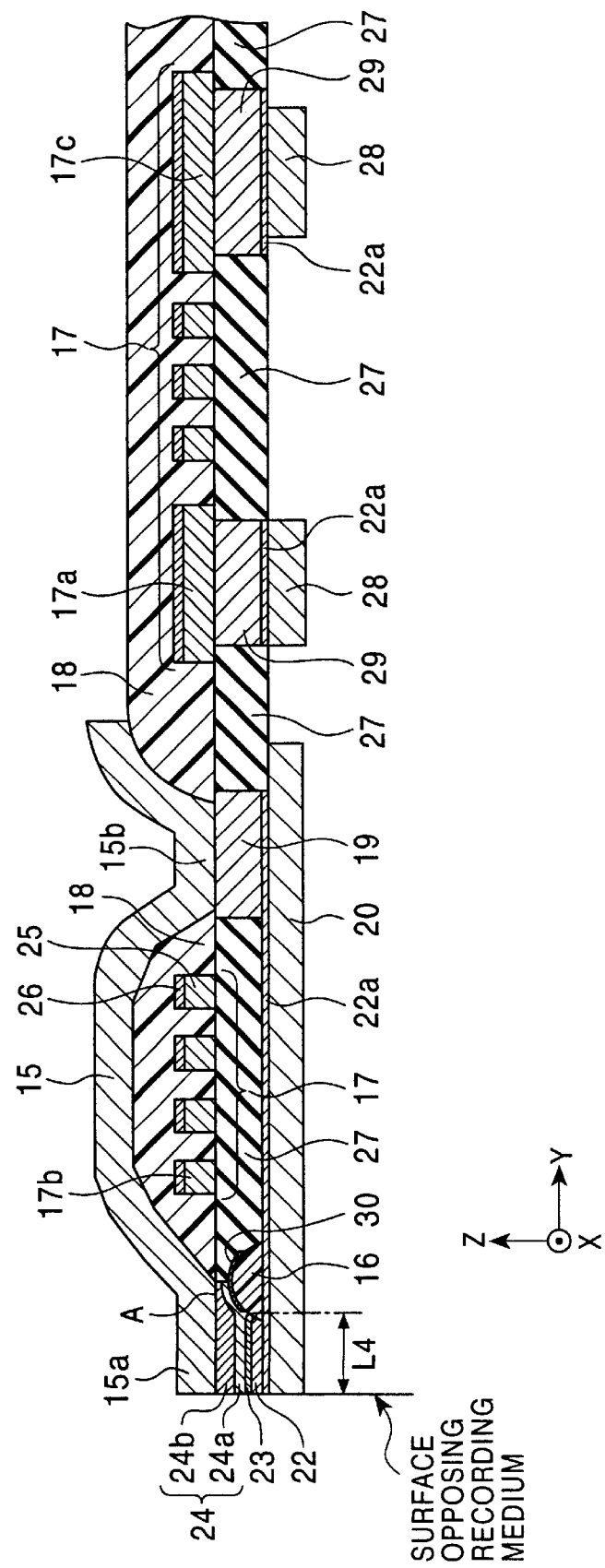
FIG. 2 is a partial longitudinal sectional view of the thin-film magnetic head, taken along line in II—II in FIG. 1.

FIG. 1 is a partial front view showing the structure of a thin-film magnetic head according to a first embodiment of the present invention, and FIG. 2 is a partial longitudinal sectional view (height-direction sectional view) of the thin-film magnetic head, taken along line II—II in FIG. 1 and viewed from the direction of the arrows.

A thin-film magnetic head shown in FIG. 1 is a recording inductive head. In the present invention, a reading head (magnetoresistive head) using a magnetoresistive effect may be placed under the inductive head.

Referring to FIGS. 1 and 2, a lower core layer 20 is made of a magnetic material such as permalloy. In a case in which a reading head is placed under the lower core layer 20, a shielding layer for protecting a magnetoresistive element, such as a giant magnetoresistive element (GMR element), an anisotropic magnetoresistive element (AMR element), or a tunneling magnetoresistive element (TMR element), from noise may be formed separate from the lower core layer 20. Alternatively, the lower core layer 20 may function as an upper shielding layer for the reading head without forming such a shielding layer.

As shown in FIG. 1, the upper surface of the lower core layer 20 extending from the base end of a lower magnetic layer 22, which will be described later, forms a flat surface 20a shown by a solid line. The upper surface of the lower core layer 20 may form an inclined surface 20b shown by a broken line which is inclined away from an upper core layer 15. By forming the inclined surface 20b on the upper side of the lower core layer 20, write fringing can be prevented more properly.

A seed layer 22a is made of, for example, a magnetic metal material, on the lower core layer 20, and a lower magnetic layer 22, a gap layer 23, and an upper magnetic layer 24 are successively stacked thereon, thereby constituting a magnetic pole section 51.

The lower magnetic layer 22 is formed on the lower core layer 20 by plating with the seed layer 22a therebetween, and is magnetically connected to the lower core layer 20. The lower magnetic layer 22 may be made of the same material as that of the lower core layer 20 or a different material. Further, the lower magnetic layer 22 may be formed of a single-layer film or a multilayer film.

Preferably, the lower magnetic layer 22 is plated with a nonmagnetic gap layer 23.

Preferably, the gap layer 23 is made of a nonmagnetic metal material and is formed on the lower magnetic layer 22 by plating. It is preferable to select as the nonmagnetic metal material at least one of NiP, NiPd, NiW, NiMo, NiRh, Au, Pt, Rh, Pd, Ru, Cr, and Ti. The gap layer 23 may be formed of a single-layer film or a multilayer film.

When the gap layer 23 is made of a NiP alloy, continuous plating during production is easy, the heat resistance is high, and the adhesion to the lower magnetic layer 22 and the upper magnetic layer 24 is superior. Since the hardness of the gap layer 23 can be made equivalent to those of the lower magnetic layer 22 and the upper magnetic layer 24, the amounts of working, for example, ion milling, of the lower magnetic layer 22, the gap layer 23, and the upper magnetic layer 24 can be made equivalent to one another. This can enhance workability.

It is preferable that the gap layer 23 be made of a NiP alloy and that the concentration of the element P be within the range of 8% by mass to 15% by mass. This allows the gap layer 23 to be stably kept nonmagnetic without being affected by external factors such as heat generation. The alloy composition of the gap layer 23 made of a NiP alloy or the like can be measured by, for example, an X-ray analyzer or a wavelength dispersive X-ray analysis system combined with a scanning electron microscope (SEM), a transmission electron microscope (TEM), or the like.

While the gap layer 23 may be made of an insulating material such as $Al_2O_3$, in this case, a seed layer must be formed on the gap layer 23, and the formation of the gap layer 23 is complicated. Therefore, it is preferable to form the gap layer 23 by plating.

The gap layer 23 is plated with an upper magnetic layer 24 magnetically connected to an upper core layer 15 which will be described later. The upper magnetic layer 24 may be made of the same material as that of the upper core layer 15, or may be made of a different material.

In the present invention, as described above, since the gap layer 23 is made of a nonmagnetic metal material or the like and is formed by plating, the lower magnetic layer 22, the gap layer 23, and the upper magnetic layer 24 can be continuously formed by plating.

While each of the lower magnetic layer 22 and the upper magnetic layer 24 may be made of the same material as that of the core layer to which it is magnetically connected, or may be made of a different material, as described above, it is preferable that each of the lower magnetic layer 22 and the upper magnetic layer 24 opposing the gap layer 23 have a higher saturation magnetic flux density than that of the core layer, in order to increase the recording density. When the lower magnetic layer 22 and the upper magnetic layer 24 have such a high saturation magnetic flux density, it is possible to concentrate the recording magnetic field adjacent to the gap, and to thereby increase the recording density.

In the first embodiment shown in FIGS. 1 and 2, the upper magnetic layer 24 has a two-layer structure.

The upper magnetic layer 24 is composed of a lower layer 24a in contact with the gap layer 23, and an upper layer 24b formed thereon. The lower layer 24a is a high-Bs layer having a higher saturation magnetic flux density than that of the upper layer 24b.

By thus making the lower layer 24a adjacent to the gap layer 23 of a magnetic material having a high saturation magnetic flux density, a magnetic flux flowing from the upper core layer 15 can be easily concentrated adjacent to the gap, and the recording density can be increased.

The lower layer 24a may be made of a magnetic material, such as a NiFe alloy, a CoFe alloy, or a CoFeNi alloy. In a case in which the upper layer 24b is made of the same magnetic material as that of the lower layer 24a, for example, is made of a NiFe alloy, the saturation magnetic flux density Bs of the lower layer 24a can be made higher than that of the upper layer 24b by making the Fe concentration of the NiFe alloy of the lower layer 24a higher than the Fe concentration of the NiFe alloy of the upper layer 24b.

In a case in which the upper magnetic layer 24 is a multilayer film composed of three or more magnetic layers, similarly, it is preferable to select the magnetic materials of the magnetic layers so that a magnetic layer nearest the gap layer 23 has the highest saturation magnetic flux density Bs.

In the thin-film magnetic head shown in FIGS. 1 and 2, the width in the track width direction (X-direction in FIG. 1) of the upper magnetic layer 24 is set to be less than that of the lower core layer 20. The track width Tw is defined by the width of the upper magnetic layer 24.

Preferably, the track width Tw is set to be 0.7 μm or less, and more preferably, 0.4 μm or less.

In FIG. 1, the total thickness of the lower magnetic layer 22, the gap layer 23, and the upper magnetic layer 24 is designated H2. For example, the thicknesses of the lower magnetic layer 22, the gap layer 23, and the upper magnetic layer 24 are set to be approximately 0.4 μm, approximately 0.2 μm, and 2 μm, respectively. These settings can properly prevent side fringing.

As shown in FIG. 2, a gap-depth defining layer 16 is made of an organic material or the like behind the lower magnetic layer 22, the gap layer 23, and the upper magnetic layer 24.

Figure 3:
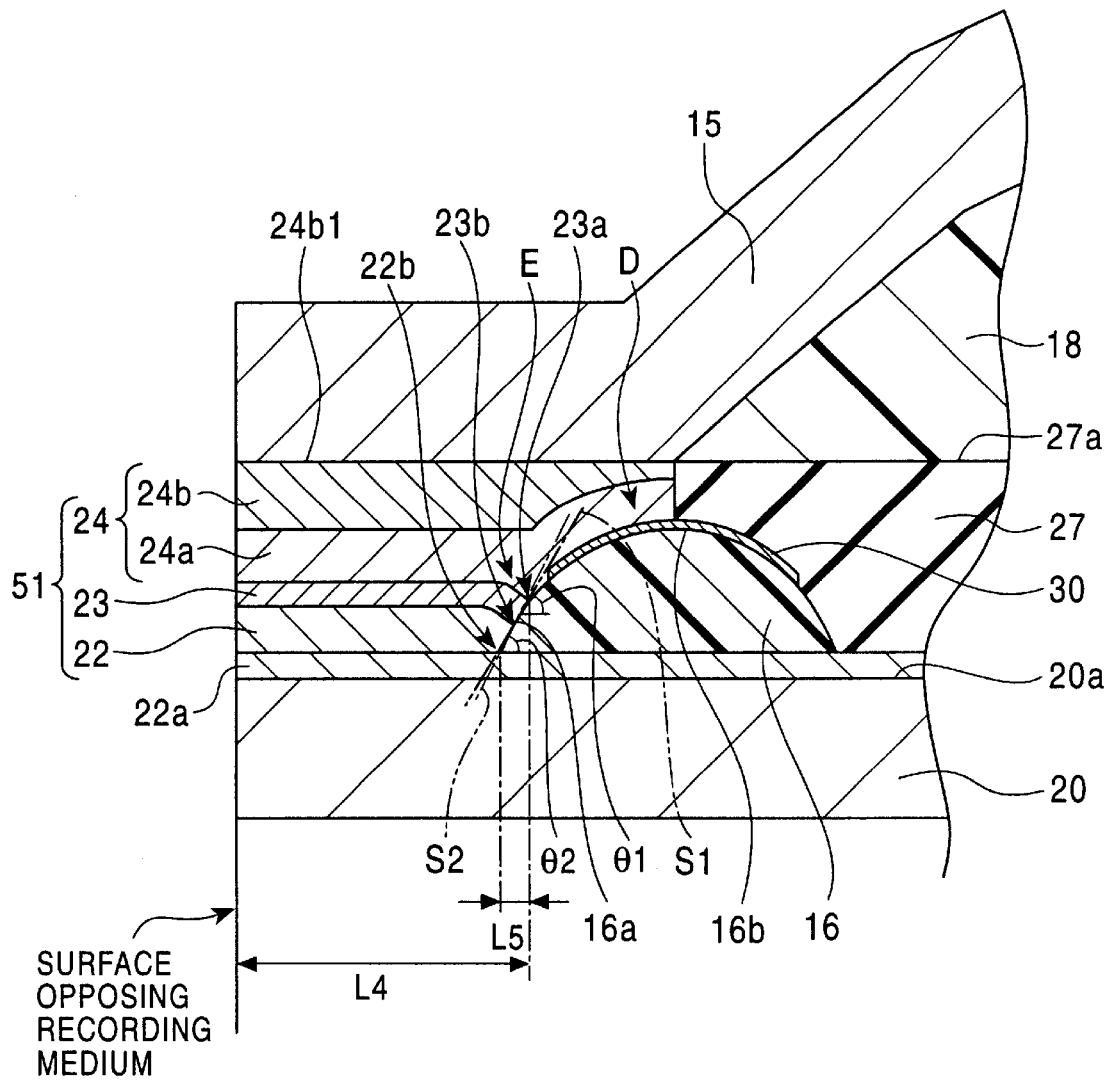
FIG. 3 is a partial longitudinal sectional view showing the portions near a surface of the thin-film magnetic head shown in FIG. 2 which opposes a recording medium.

FIG. 3 is a partially enlarged view showing the portions near a surface of the thin-film magnetic head shown in FIG. 2 opposing a recording medium.

A front end face 16a of the gap-depth defining layer 16 on the side of a surface opposing a recording medium (recording-medium opposing surface) is a curved face which is inclined upward (in the Z-direction) from the lower core layer 20 so as to gradually get further away from the recording-medium opposing surface. In this embodiment, the longitudinal cross section (the cross section in the height direction) of the gap-depth defining layer 16 is substantially semielliptical.

As shown in FIG. 3, the depth in the height direction (gap depth) of a joint surface between the gap layer 23 and the upper magnetic layer 24 is limited to L4 by the front end face 16a of the gap-depth defining layer 16.

The lower magnetic layer 22 is formed on the lower core layer 20 with the seed layer 22a therebetween by plating so that it extends from the recording-medium opposing surface to the front end face 16a of the gap-depth defining layer 16.

A metal film 30 is formed on an upper surface 16b of the gap-depth defining layer 16 disposed behind the contact surface between the lower magnetic layer 22 and the gap-depth defining layer 16 in the height direction (in the Y-direction).

That is, the lower magnetic layer 22 does not extend onto the metal film 30. If the lower magnetic layer 22 extends onto the metal film 30, a magnetic field leaks between the extending portion of the lower magnetic layer 22 and the upper magnetic layer 24, and a leakage field from the recording-medium opposing surface is reduced. Moreover, the gap depth is increased, and is not easily set within a predetermined range.

In this embodiment, the gap layer 23 formed on the lower magnetic layer 22 is formed on the side offset from the metal film 30 formed on the gap-depth defining layer 16 toward the recording-medium opposing surface so that it is in contact with the front end face 16a of the gap-depth defining layer 16 on which the metal film 30 is not formed.

The lower layer (high-Bs layer) 24a of the upper magnetic layer 24 is formed on the gap layer 23 by plating so as to extend onto a portion of the metal film 30 on the gap-depth defining layer 16 which is exposed in a region D offset from an underlying insulating layer 27 toward the recording-medium opposing surface.

The upper layer 24b of the upper magnetic layer 24 is formed on the lower layer 24a by plating, and an upper surface 24b1 thereof is flush with an upper surface 27a of the underlying insulating layer 27 disposed behind the upper layer 24b in the height direction (Y-direction).

In FIG. 3, the metal film 30 formed on the gap-depth defining layer 16 serves as a seed layer for the lower layer (high-Bs layer) 24a of the upper magnetic layer 24, as well as the gap layer 23.

Therefore, the lower layer 24a can be suitably formed with a predetermined thickness over the gap layer 23 and the metal film 30 by plating.

In this way, in the present invention, since the thick lower layer 24a can be suitably formed on the gap-depth defining layer 16, a magnetic flux flowing from the upper core layer 15 to the upper magnetic layer 24 flows into the lower layer (high-Bs layer) 24a having a high saturation magnetic flux density formed on the gap-depth defining layer 16 via the upper layer 24b, and is properly guided to the recording-medium opposing surface without causing any magnetic saturation in the upper magnetic layer 24. Therefore, a large magnetic flux is produced from the recording-medium opposing surface of the lower layer 24a, and this makes it possible to produce a thin-film magnetic head which can suitably respond to future increases in recording density.

Figure 4:
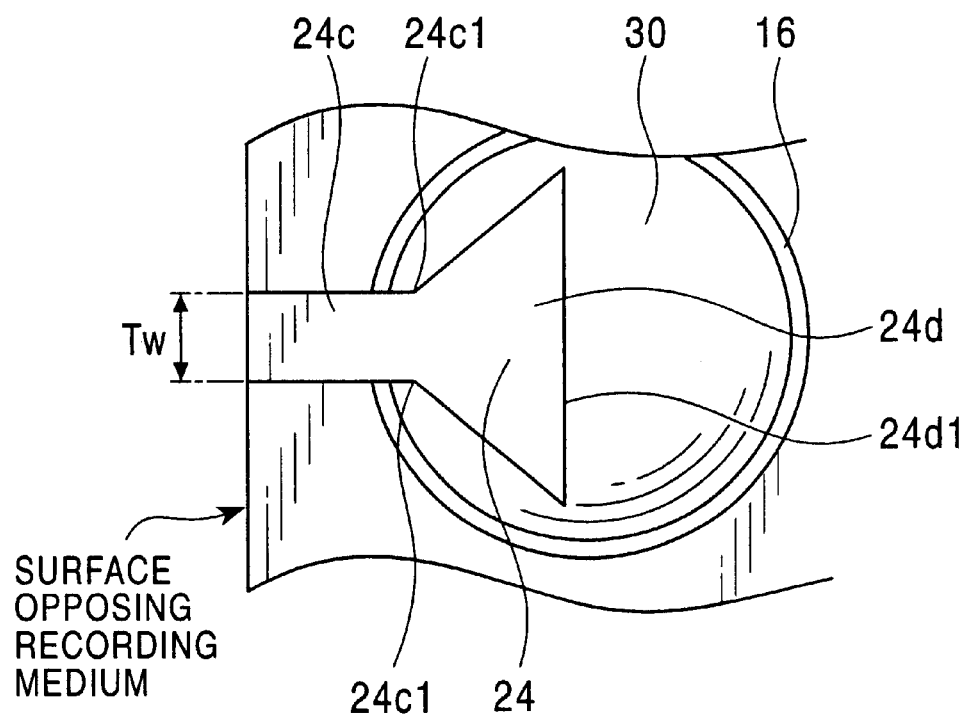
FIG. 4 is a partial plan view of an upper magnetic layer in the thin-film magnetic head.

FIG. 4 is a partial plan view of the upper magnetic layer 24. The above-described upper core layer 15 and the underlying insulating layer 27, which will be described later, are omitted from FIG. 4.

As shown in FIG. 4, the upper magnetic layer 24 includes a narrow front area 24c having a width in the track width direction (X-direction) equal to the track width Tw on the recording-medium opposing surface, and a rear area 24d which connected to the front area 24c so as to increase in width toward the rear side in the height direction.

As will be described in the following production method, the lower layer 24a of the upper magnetic layer 24 can be formed by plating so as to extend onto the metal film 30 formed on the upper surface of the gap-depth defining layer 16, and a large thickness thereof can be ensured. Moreover, the upper layer 24b can be formed on the lower layer 24a by plating, and the upper magnetic layer 24 can be formed with a predetermined thickness. Therefore, magnetic saturation of the upper magnetic layer 24 can be suitably prevented.

The positions of a rear edge (magnetic pole edge) 24d1 and an end portion 24c1, from which the upper magnetic layer 24 increases in width in the height direction, of the upper magnetic layer 24 shown in FIG. 4 may be freely designed and changed in order to optimize the overwriting characteristic depending on the position of the rear edge 24d1 and NLTS and the pulse width at the 50% threshold depending on the end portion 24c1. This increases the degree of flexibility in design.

Since the rear end portion of the upper magnetic layer 24 on the gap-depth defining layer 16 can be formed with a sufficient volume, the upper magnetic layer 24 can be formed in a predetermined shape, regardless of the accuracy of flattening.

Figure 35:
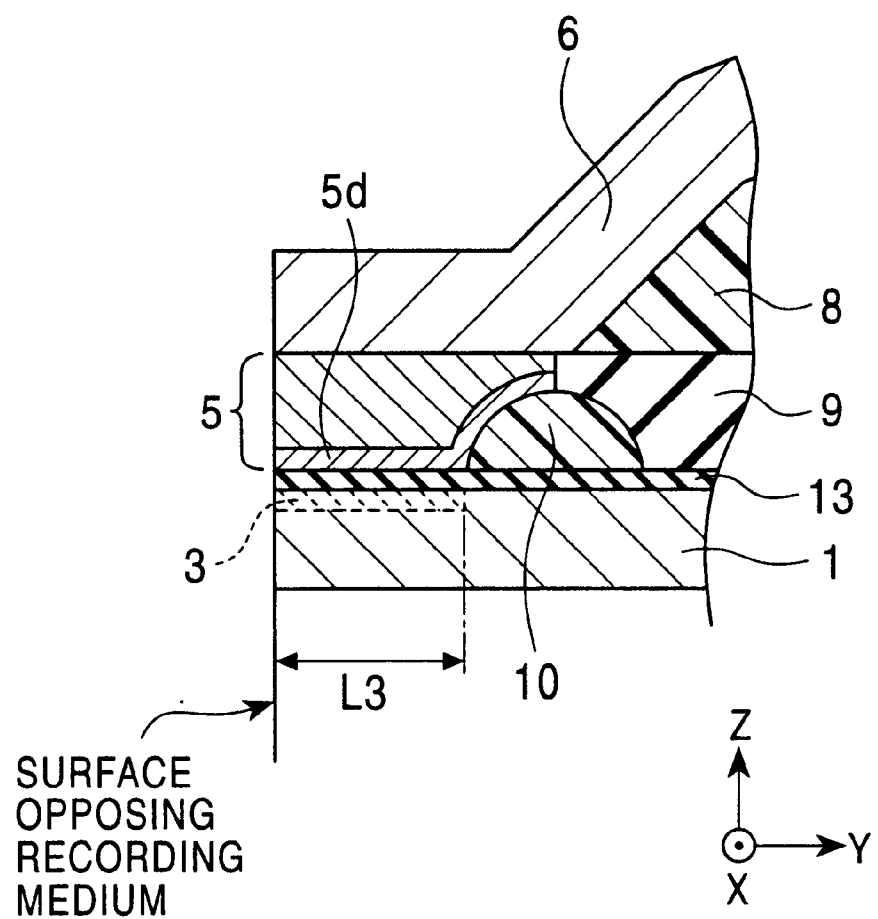
FIG. 35 is a partial longitudinal sectional view of a further thin-film magnetic head as a related art.

The lower magnetic layer 22 is formed on the lower core layer 20 by plating, but is not formed by cutting the lower core layer 20, as in the related art shown in FIG. 35. Therefore, magnetic powder will not adhere onto both side faces in the track width direction of the upper magnetic layer 24. Consequently, trimming for removing the magnetic powder is unnecessary, and the controllability of the track width can be enhanced.

Next, the material of the gap-depth defining layer 16 in the present invention will be described.

It is preferable that the gap-depth defining layer 16 be made of an organic material. A resist material may be selected as the organic material. This allows the gap-depth defining layer 16 to be easily formed in a predetermined shape.

In a case in which the gap-depth defining layer 16 is made of a resist material such as ultraviolet curing resin, the resist material is heat-treated to cause sagging on its surface and is cured by irradiation with ultraviolet rays after being applied. This makes it possible to easily work the gap-depth defining layer 16 so that its longitudinal cross section is substantially semielliptical, as shown in FIG. 3.

The gap-depth defining layer 16 may be made of an inorganic material. The inorganic material is, for example, $SiO_2$ or $Al_2O_3$. In a case in which the gap-depth defining layer 16 is made of an inorganic material, it is difficult to make the longitudinal cross section thereof substantially semielliptical, as shown in FIG. 3. Therefore, the inorganic material is effective when making the longitudinal cross section substantially rectangular or substantially trapezoidal. The structure of the gap-depth defining layer 16 of substantially rectangular cross section will be described in detail later with reference to the drawings.

The material of the metal film 30 will now be described below.

It is preferable that the metal film 30 be made of a nonmagnetic metal material, and that at least one of Au, Cu, Cu—Ni, Pt, and Ti be selected as the nonmagnetic metal material. In a case in which the metal film 30 is made of the nonmagnetic metal material, it will not melt when the upper magnetic layer 24 is formed thereon by plating. Consequently, even when the metal film 30 is made thin, it can properly function as a seed layer for the upper magnetic layer 24. It is preferable to first apply Ti and to then apply at least one of Au, Cu, Cu—Ni, and Pt thereon in order to increase the adhesion.

The metal film 30 may be made of a magnetic metal material. The magnetic metal material is, for example, a NiFe alloy, a CoFe alloy, or a CoFeNi alloy. However, it has been confirmed that the metal film 30 made of a magnetic metal material having a high Ni concentration melts when the upper magnetic layer 24 is deposited thereon by plating. For this reason, it is preferable that the thickness of the metal film 30 made of a magnetic material having a high Ni concentration be more than when the metal film 30 is made of a nonmagnetic metal material.

It is preferable that the metal film 30 made of a nonmagnetic metal material or a magnetic metal material be formed by sputtering. This allows the metal film 30 to be suitably and easily formed on the gap-depth defining layer 16. While the thickness of the metal film 30 is limited when the metal film 30 is formed by sputtering, the metal film 30 can satisfactorily function as a seed layer as long as the thickness thereof is within the range of 0.02 µm to 0.3 µm.

The preferable shape of the gap-depth defining layer 16 will be described below.

In FIG. 3, a virtual plane SI passing through an upper end portion 23a and a lower end portion 23b of a surface of the gap layer 23 abutting the gap-depth defining layer 16, and the upper surface 20a of the lower core layer 20 form an angle θ1 ranging from 45° to 90°. For easy viewing, the angle θ1 is shown as the angle formed by the virtual plane S1 and a plane in parallel with the upper surface 20a of the lower core layer 20 in FIG. 3.

When the angle θ1 is 45° or more, as in this embodiment, it is possible to reduce changes in the gap depth L4 when the thickness of the gap layer 23 varies. It is also possible to prevent the gap layer 23 from sagging adjacent to the surface abutting the gap-depth defining layer 16.

When the angle θ1 is 90° or less, a constriction which suppresses the flow of the magnetic flux is not caused in the upper magnetic layer 24, and therefore, the writing characteristics of the magnetic head are prevented from being degraded.

A virtual plane S2 passing through an upper end portion 23b and a lower end portion 22b of a surface of the lower magnetic layer 22 abutting the gap-depth defining layer 16, and the upper surface 20a of the lower core layer 20 form an angle θ2 ranging from 45° to 90°. In FIG. 3, the lower end portion of the surface of the gap layer 23 abutting the gap-depth defining layer 16 and the upper end portion of the surface of the lower magnetic layer 22 abutting the gap-depth defining layer 16 coincide with each other. For easy viewing, the angle θ2 is shown as the angle formed by the virtual plane S2 and a plane in parallel with the upper surface 20a of the lower core layer 20 in FIG. 3.

When the angle θ2 is 45° or more, a distance L5 between the front edge of the gap-depth defining layer 16 (the same as the lower end portion 22b of the surface of the lower magnetic layer 22 abutting the gap-depth defining layer 16) and the surface of the gap layer 23 abutting the gap-depth defining layer 16 can be reduced. This can reduce variations in gap depth L4 among products.

When the angle θ2 is 90° or less, a constriction which suppresses the flow of the magnetic flux is not caused in the upper magnetic layer 24, and therefore, the writing characteristics of the magnetic head are prevented from being degraded.

Since the front end face 16a of the gap-depth defining layer 16 on the side of the recording-medium opposing surface is curved in the magnetic head shown in FIG. 3, there is a difference between the angle θ1 formed by the virtual plane S1 passing through the upper end portion 23a and the lower end portion 23b of the surface of the gap layer 23 abutting the gap-depth defining layer 16, and the upper surface 20a of the lower core layer 20, and the angle θ2 formed by the virtual plane S2 passing through the upper end portion 23b and the lower end portion 22b of the surface of the lower magnetic layer 22 abutting the gap-depth defining layer 16, and the upper surface 20a of the lower core layer 20.

In this embodiment, both the angles θ1 and θ2 may be within the range of 45° to 90°, or one of them may be within that range.

While it is preferable that at least one of the angles θ1 and θ2 be within the range of 45° to 90° in the present invention, they are not limited to the above range.

Figure 5:
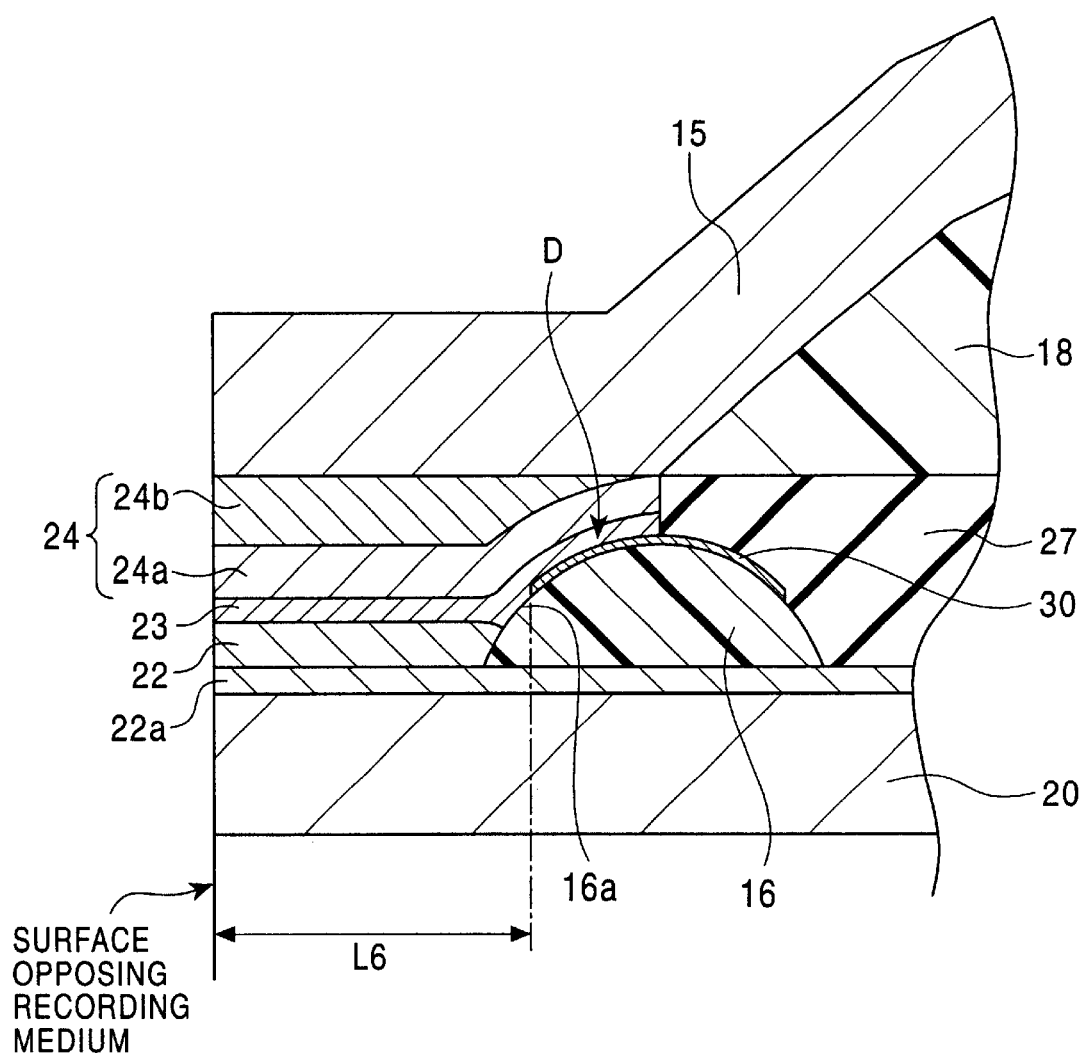
FIG. 5 is a partial longitudinal sectional view showing the portions near a surface of a thin-film magnetic head according to a second embodiment which opposes a recording medium.

This setting of the angles θ1 and θ2 also applies to the following embodiments shown in FIG. 5 and subsequent figures.

A second embodiment of the present invention will be described below. FIG. 5 is a partially enlarged longitudinal sectional view of a thin-film magnetic head according to the second embodiment.

Referring to FIG. 5, a gap layer 23 is formed by plating so as to extend onto a metal film 30 which is formed on a gap-depth defining layer 16. In this embodiment, a lower magnetic layer 22 is formed by plating between a recording-medium opposing surface and a front end face 16a of the gap-depth defining layer 16, and does not extend onto the metal film 30 formed on the gap-depth defining layer 16, in a manner similar to that in FIG. 3.

The gap depth (Gd) is defined by the length L6 from the recording-medium opposing surface to the front end face 16a of the gap-depth defining layer 16 against which the gap layer 23 abuts.

A lower layer 24a of an upper magnetic layer 24 having a high saturation magnetic flux density is suitably formed over the entire gap layer 23 by plating, and an upper layer 24b having a lower saturation magnetic flux density than that of the lower layer 24a is formed on the lower layer 24a by plating.

In this embodiment, the lower layer (high-Bs layer) 24a of the upper magnetic layer 24 can also be formed with a predetermined thickness by plating so as to extend onto the gap layer 23 on the metal film 30 which is formed on the gap-depth defining layer 16. Therefore, a magnetic flux flowing from an upper core layer 15 to the upper magnetic layer 24 properly flows to the lower layer (high-Bs layer) 24a, which extends deep in the height direction and has a high saturation magnetic flux density, via the upper layer 24b, and a magnetic field leaking from the recording-medium opposing surface can be increased. Consequently, it is possible to produce a thin-film magnetic head which can suitably respond to future increases in recording density.

As will be described in the following production method, the lower layer 24a of the upper magnetic layer 24 can be formed by plating so as to extend onto the metal film 30 formed on the upper surface of the gap-depth defining layer 16, and the thickness thereof can be made large. The upper layer 24b formed on the lower layer 24a can be suitably formed by plating, and the entire upper magnetic layer 24 can be formed with a predetermined thickness. This can properly prevent magnetic saturation in the upper magnetic layer 24. Furthermore, the positions of a rear edge (magnetic pole edge) 24d1 and an end portion 24c1 (from which the upper magnetic layer 24 increases in width in the height direction) of the upper magnetic layer 24 shown in FIG. 4 can be freely designed and changed in order to optimize the overwriting characteristics, which depend on the position of the rear edge 24d1, and NLTS and the pulse width at the 50% threshold, which depend on the position of the end portion 24c1. As a result, the degree of flexibility in design can be increased.

Since the rear end portion of the upper magnetic layer 24 can be formed with a sufficient volume on the gap-depth defining layer 16, the upper magnetic layer 24 can be formed in a predetermined shape, regardless of the accuracy of flattening.

The lower magnetic layer 22 is formed on the lower core layer 20 by plating, but is not formed by cutting the lower core layer 20, as in the related art shown in FIG. 35. Therefore, magnetic powder will not adhere to both side faces of the upper magnetic layer 24 in the height direction, and a trimming process for removing the magnetic powder is unnecessary. This can enhance the controllability of the track width.

While the gap layer 23 extends onto the rear end of a portion of the metal film 30 which is exposed in a region D offset from an underlying insulating layer 27 toward the recording-medium opposing surface, it need not be always extend onto the rear end of the portion, but may be formed over the lower magnetic layer 22 and a part of the metal film 30.

In a case in which the gap layer 23 is formed by plating so as to extend onto the metal film 30, as shown in FIG. 5, only the gap layer 23, or only the gap layer 23 and the metal film 30 are exposed under the upper magnetic layer 24.

In contrast, in FIG. 3, a portion of the gap-depth defining layer 16 placed within the distance E between the rear end of the gap layer 23 and the front end of the metal film 30 is exposed under the upper magnetic layer 24, as well as the gap layer 23 and the metal film 30. The upper magnetic layer 24 is suitably formed by plating on the gap layer 23 and the metal film 30, but is not easily formed on the gap-depth defining layer 16 made of an insulating material. Since the portion of the gap-depth defining layer 16 exposed between the gap layer 23 and the metal film 30 has a small area E, the upper magnetic layer 24 which is formed by plating on the gap layer 23 and the metal film 30 fills the small area E, and the thickness of the portion of the upper magnetic layer 24 formed on the small area E is prevented from being much less than those of the other portions. It is preferable that the height of the area E in parallel with the lower core layer 20 be within the range of approximately 0.2 $\mu$m to 0.8 $\mu$m.

In order to more reliably form the upper magnetic layer 24, it is preferable that the gap-depth defining layer 16 be not exposed even in the small area E shown in FIG. 3.

Since the gap layer 23 is also formed on the metal film 30 in FIG. 5, the gap-depth defining layer 16 is not exposed under the upper magnetic layer 24, as in FIG. 3. Therefore, it is possible to more reliably form the upper magnetic layer 24 with a predetermined thickness.

The manner shown in FIG. 5 in which the gap layer 23 extends onto the metal film 30 on the gap-depth defining layer 16 is also applicable to the following embodiments.

Figure 6:
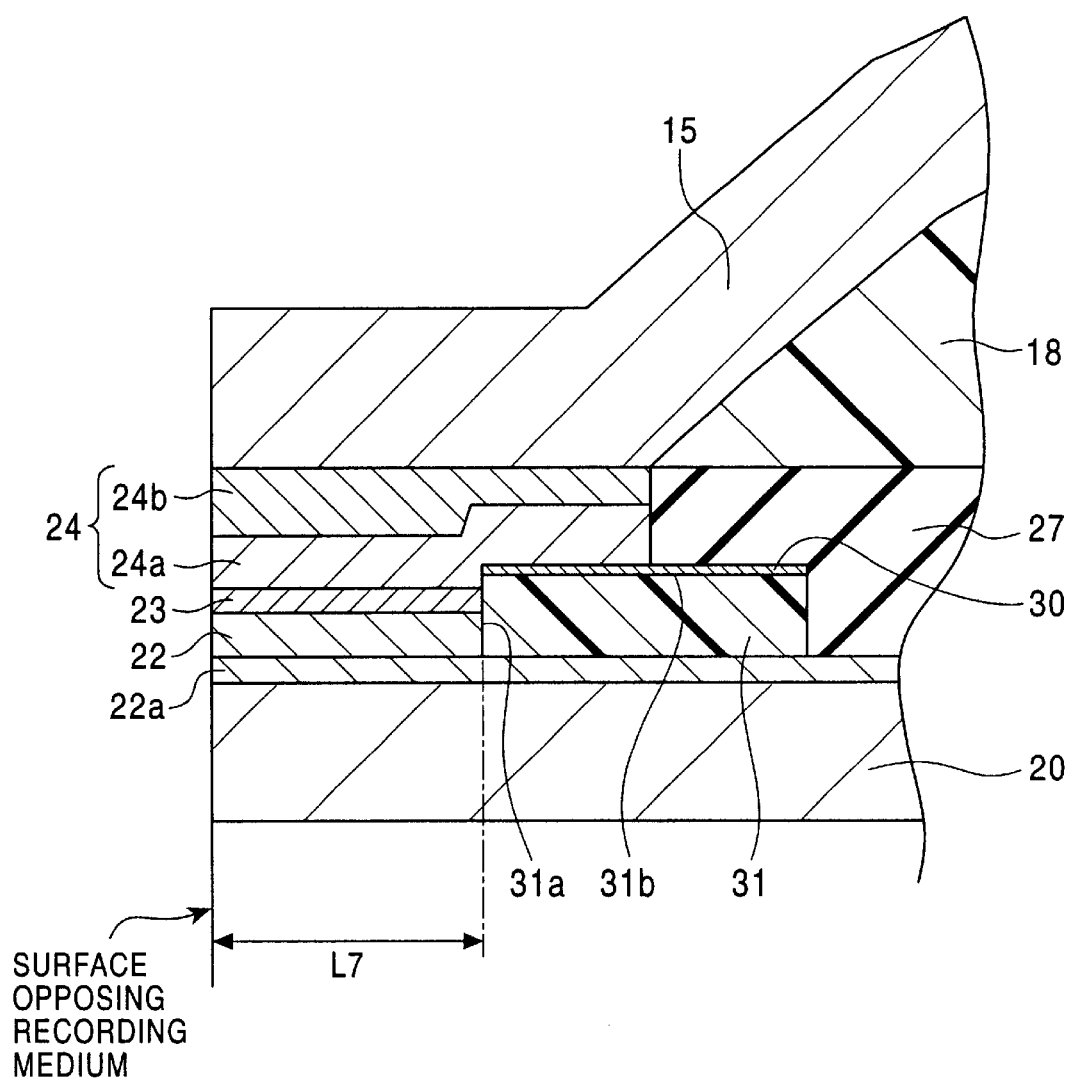
FIG. 6 is a partial longitudinal sectional view showing the portions near a surface of a thin-film magnetic head according to a third embodiment of the present invention which opposes a recording medium.

FIG. 6 is a partially enlarged longitudinal sectional view of a thin-film magnetic head according to a third embodiment of the present invention.

Referring to FIG. 6, a front end face 31a of a gap-depth defining layer 31 on the side of a recording-medium opposing surface vertically rises on a lower core layer 20 in the upward direction (Z-direction), and the longitudinal cross section of the gap-depth defining layer 31 is substantially rectangular.

A metal film 30 is formed on an upper surface 31b of the gap-depth defining layer 31. The gap-depth defining layer 31 and the metal film 30 are made of the materials which have been described with reference to FIG. 3. In this embodiment, the gap-depth defining layer 33 can be suitably formed so that the longitudinal cross section (cross section in the height direction) is substantially rectangular, as shown in FIG. 6, regardless of whether it is made of an organic material or an inorganic material.

A lower magnetic layer 22 is formed on the lower core layer 20 by plating with a seed layer 22a therebetween so that it extends between the recording-medium opposing surface and the front end face 31a of the gap-depth defining layer 31. Similarly, a gap layer 23 is formed on the lower magnetic layer 22 by plating so that it extends between the recording-medium opposing surface and the front end face 31a of the gap-depth defining layer 31. The gap depth is defined by the length L7 from the recording-medium opposing surface to the front end face 31a.

A lower layer 24a of an upper magnetic layer 24 having a high saturation magnetic flux density is formed by plating so that it extends over the gap layer 23 and the metal film 30 formed on the gap-depth defining layer 31. An upper layer 24b having a lower saturation magnetic flux density than that of the lower layer 24a is formed on the lower layer 24a by plating.

Figure 7:
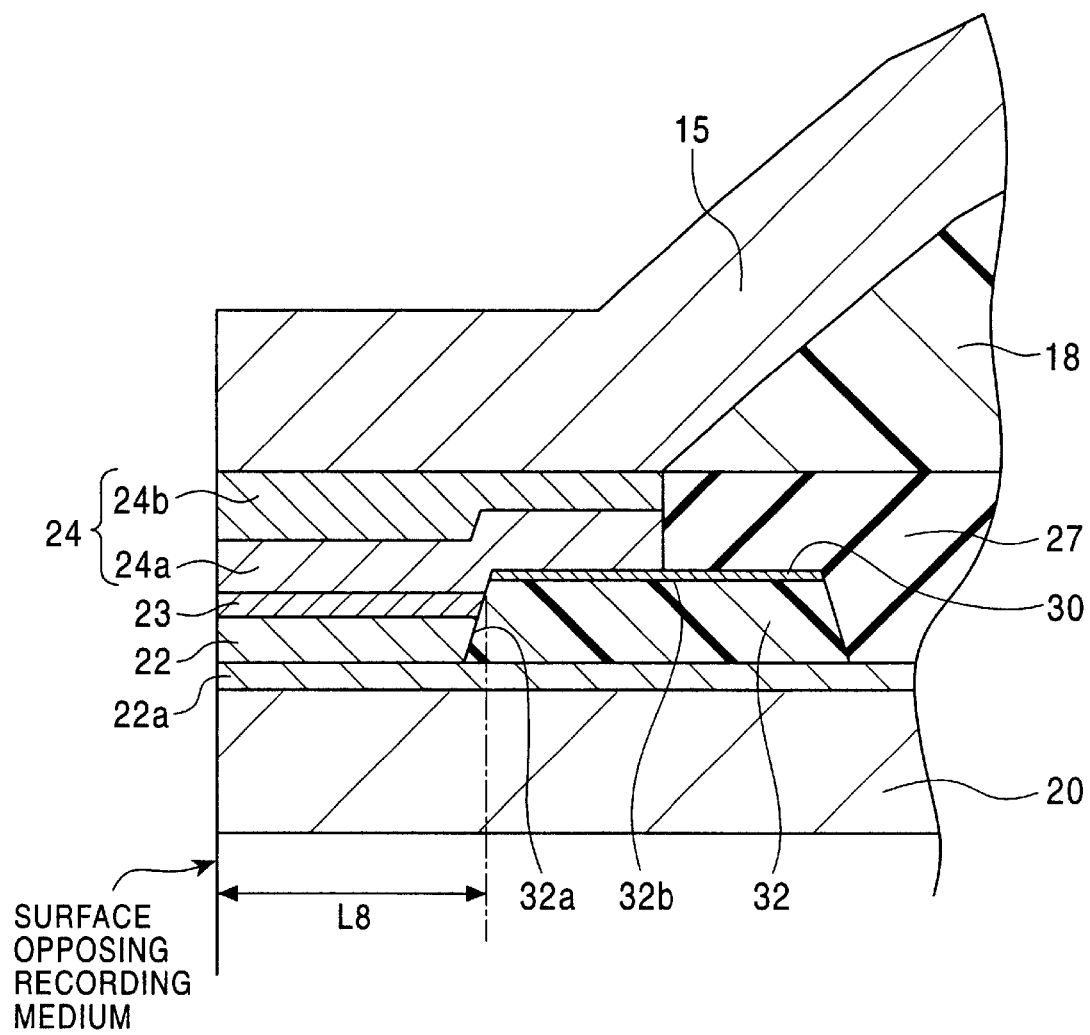
FIG. 7 is a partial longitudinal sectional view showing the portions near a surface of a thin-film magnetic head according to a fourth embodiment of the present invention which opposes a recording medium.

FIG. 7 is a partially enlarged longitudinal sectional view of a thin-film magnetic head according to a fourth embodiment of the present invention.

Referring to FIG. 7, a front end face 32a of a gap-depth defining layer 32 on the side of a recording-medium opposing surface is formed of an inclined face which is inclined upward (in the Z-direction) from a lower core layer 20 in the height direction. The longitudinal cross section (cross section in the height direction) of the gap-depth defining layer 32 is substantially trapezoidal.

A metal film 30 is formed on an upper surface 32b of the gap-depth defining layer 32. The gap-depth defining layer 32 and the metal film 30 are made of the materials which have been described with reference to FIG. 3. In this embodiment, the gap-depth defining layer 32 can be suitably formed with high working accuracy so that the longitudinal cross section is substantially trapezoidal, as shown in FIG. 7, regardless of whether it is made of an organic material or an inorganic material.

In FIG. 7, a lower magnetic layer 22 is formed on a lower core layer 20 with a seed layer 22a therebetween by plating so that it extends between the recording-medium opposing surface and the front end face 32a of the gap-depth defining layer 32. Similarly, a gap layer 23 is formed on the lower magnetic layer 22 by plating so that it extends between the recording-medium opposing surface and the front end face 32a of the gap-depth defining layer 32. The gap depth is defined by the length L8 between the recording-medium opposing surface and the position where the gap layer 23 abuts the front end face 32a.

A lower layer 24a of an upper magnetic layer 24 having a high saturation magnetic flux density is formed by plating so that it extends over the gap layer 23 and the metal film 30 formed on the gap-depth defining layer 32. An upper layer 24b having a lower saturation magnetic flux density than that of the lower layer 24a is formed on the lower layer 24a.

In the embodiment shown in FIG. 6 or 7, since the lower layer (high-Bs layer) 24a of the upper magnetic layer 24 can be formed with a predetermined thickness on the metal film 30 on the gap-depth defining layer 31 or 32 by plating, a magnetic flux flowing from an upper core layer 15 to the upper magnetic flux layer 24 properly flows to the lower layer (high-Bs layer) 24a, which extends deep in the height direction and has a high saturation magnetic flux density, via the upper layer 24b, and a magnetic field leaking from the recording-medium opposing surface can be increased. Consequently, it is possible to produce a thin-film magnetic head which can respond to future increases in recording density.

As will be described in the following production method, the lower layer 24a of the upper magnetic layer 24 can be formed by plating so as to extend onto the metal film 30 formed on the upper surface of the gap-depth defining layer 31 or 32, and the thickness thereof can be made large. The upper layer 24b formed on the lower layer 24a can be suitably formed by plating, and the entire upper magnetic layer 24 can be formed with a predetermined thickness. This can properly prevent magnetic saturation in the upper magnetic layer 24. Furthermore, the positions of a rear edge (magnetic pole edge) 24d1 and an end portion 24c1 (from which the upper magnetic layer 24 increases in width in the height direction) of the upper magnetic layer 24 shown in FIG. 4 can be freely designed and changed in order to optimize the overwriting characteristics, which depend on the position of the rear edge 24d1, and NLTS and the pulse width at the 50% threshold, which depend on the position of the end portion 24c1. As a result, the degree of flexibility in design can be increased.

Since the rear end portion of the upper magnetic layer 24 can be formed with a sufficient volume on the gap-depth defining layer 31, the upper magnetic layer 24 can be formed in a predetermined shape, regardless of the accuracy of flattening.

The lower magnetic layer 22 is formed on the lower core layer 20 by plating, but is not formed by cutting the lower core layer 20, as in the related art shown in FIG. 35. Therefore, magnetic powder will not adhere to both side faces of the upper magnetic layer 24 in the height direction, and a trimming process for removing the magnetic powder is unnecessary. This can enhance the controllability of the track width.

Figure 8:
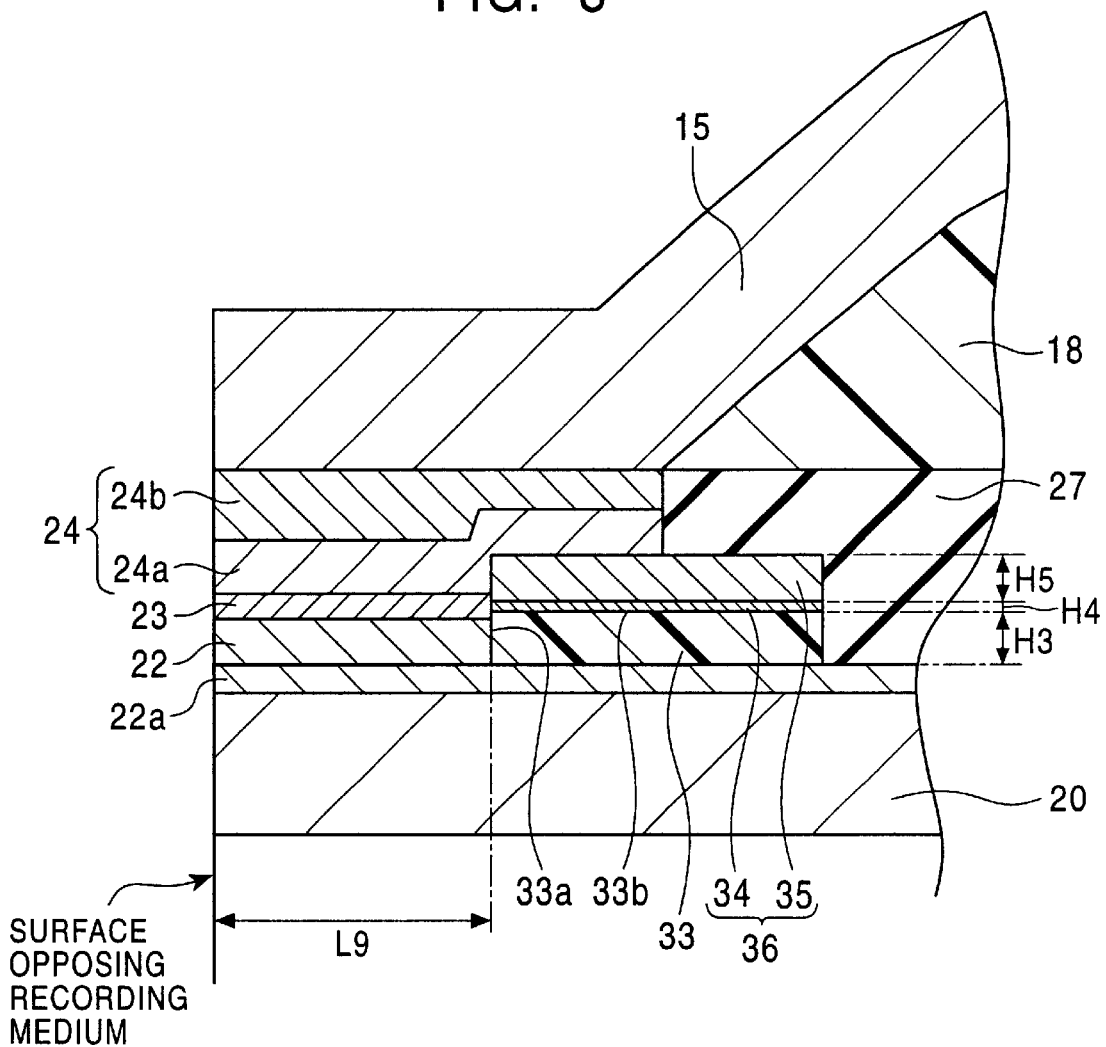
FIG. 8 is a partial longitudinal sectional view showing the portions near a surface of a thin-film magnetic head according to a fifth embodiment of the present invention which opposes a recording medium.

FIG. 8 is a partially enlarged longitudinal sectional view of a thin-film magnetic head according to a fifth embodiment of the present invention.

Referring to FIG. 8, a front end face 33a of a gap-depth defining layer 33 on the side of a recording-medium opposing surface vertically rises (in the Z-direction) from a lower core layer 20. The longitudinal cross section of the gap-depth defining layer 33 is substantially rectangular. The front end face 33a of the gap-depth defining layer 33 may be formed of an inclined face which is inclined upward from the lower core layer 20 in the height direction, and the longitudinal cross section of the gap-depth defining layer 33 may be substantially trapezoidal, as shown in FIG. 7.

A metal film 36 is formed on an upper surface 33b of the gap-depth defining layer 33. The metal film 36 has a two-layer structure composed of an underlying film 34 made of a nonmagnetic metal material or a magnetic metal material, and a nonmagnetic metal film 35 formed thereon. It is preferable that the underlying film 34 be formed by sputtering, as in FIG. 3, and that the thickness H4 thereof be set to be within the range of approximately 0.05 $\mu$m to 0.2 $\mu$m. It is preferable that the nonmagnetic metal film 35 be formed on the underlying film 34 by plating, and that the thickness H5 thereof be set to be more than that of the underlying film 34, for example, within the range of 0.2 $\mu$m to 1.0 $\mu$m.

Preferably, the nonmagnetic metal film 35 is made of at least one of NiP, NiPd, NiW, NiMo, Au, Pt, Rh, Pd, Ru, Cr, and Ti. By using these materials, the nonmagnetic metal film 35 can be formed with a predetermined thickness, and can be made suitably nonmagnetic.

When the nonmagnetic metal film 35 is made of a NiP alloy, plating is easy, the heat resistance is high, and the adhesion to an upper magnetic layer 24 formed on the metal film 36 is superior. It is preferable that nonmagnetic metal film 35 be made of a NiP alloy and that the concentration of the element P be within the range of 8% by mass to 15% by mass. This allows the nonmagnetic metal film 35 to be stably kept nonmagnetic without being affected by external factors such as heat generation. The alloy composition of the nonmagnetic metal film 35 made of a NiP alloy or the like can be measured by, for example, an X-ray or a wavelength dispersive X-ray analysis system combined with an SEM, a TEM, or the like.

In this embodiment, the gap-depth defining layer 33 can be suitably formed so that its longitudinal cross section is substantially rectangular, as shown in FIG. 8, regardless of whether it is made of an organic material or an inorganic material.

A lower magnetic layer 22 is formed on the lower core layer 20 with a seed layer 22a therebetween by plating so that it extends between the recording-medium opposing surface and the front end face 33a of the gap-depth defining layer 33. Similarly, a gap layer 23 is formed on the lower magnetic layer 22 by plating so that it extends between the recording-medium opposing surface and the front end face 33a of the gap-depth defining layer 33. The gap depth (Gd) is defined by the length L9 between the recording-medium opposing surface and the point where the gap layer 23 abuts the front end face 33a.

A lower layer 24a of the upper magnetic layer 24 having a high saturation magnetic flux density is formed by plating so that it extends over the gap layer 23 and the metal film 36 formed on the gap-depth defining layer 33. An upper layer 24b having a lower saturation magnetic flux density than that of the lower layer 24a is formed on the lower layer 24a.

In this embodiment, the lower layer (high-Bs layer) 24a of the upper magnetic layer 24 can also be formed with a predetermined thickness by plating so that it extends onto the metal film 36 formed on the gap-depth defining layer 33. Therefore, a magnetic flux flowing from an upper core layer 15 to the upper magnetic layer 24 properly flows to the lower layer (high-Bs layer) 24a, which extends deep in the height direction and has a high saturation magnetic flux density, via the upper layer 24b, and this can increase the leakage field from the recording-medium opposing surface. Consequently, it is possible to produce a thin-film magnetic head which can suitably respond to future increases in recording density.

As will be described in the following production method, the lower layer 24a of the upper magnetic layer 24 can be formed by plating so as to extend onto the metal film 36 formed on the upper surface of the gap-depth defining layer 33, and the thickness thereof can be made large. The upper layer 24b formed on the lower layer 24a can be suitably formed by plating, and the entire upper magnetic layer 24 can be formed with a predetermined thickness. This can properly prevent magnetic saturation in the upper magnetic layer 24. Furthermore, the positions of a rear edge (magnetic pole edge) 24d1 and an end portion 24c1 (from which the upper magnetic layer 24 increases in width in the height direction) of the upper magnetic layer 24 shown in FIG. 4 can be freely designed and changed in order to optimize the overwriting characteristics, which depend on the position of the rear edge 24d1, and NLTS and the pulse width at the 50% threshold, which depend on the position of the end portion 24c1. As a result, the degree of flexibility in design can be increased.

Since the rear end portion of the upper magnetic layer 24 can be formed with a sufficient volume on the gap-depth defining layer 33, the upper magnetic layer 24 can be formed in a predetermined shape, regardless of the accuracy of flattening.

The lower magnetic layer 22 is formed on the lower core layer 20 by plating, but is not formed by cutting the lower core layer 20, as in the related art shown in FIG. 35. Therefore, magnetic powder will not adhere to both side faces of the upper magnetic layer 24 in the height direction, and a trimming process for removing the magnetic powder is unnecessary. This can enhance the controllability of the track width.

The gap-depth defining layer 33 can be formed by two methods which will be described in detail later. In one method in which the longitudinal cross section of the gap-depth defining layers 31, 32, and 33 shown in FIGS. 6, 7, and 8 is substantially rectangular or substantially trapezoidal, it is preferable that the thickness of the gap-depth defining layer, be not so large.

The thickness H3 of the gap-depth defining layer 33 shown in FIG. 8 is set to be small, for example, approximately 0.4 μm. When the thickness of the gap-depth defining layer 33 is too large in the following production method, resist accumulation is prone to occur between the front end face 33a of the gap-depth defining layer 33 and the lower core layer 20. Such resist accumulation makes it impossible to suitably deposit the lower magnetic layer 22, and the gap layer 23 and the upper magnetic layer 24 formed thereon by plating, and a defective portion which is not plated or is plated with only a thin film is prone to be formed between the front end face 33a of the gap-depth defining layer 33 and the rear end face of the upper magnetic layer 22 or the like.

In order to overcome such problems, it is preferable to reduce the thickness H3 of the gap-depth defining layer 33. However, since the distance between the lower core layer 20 and the upper magnetic layer 24 with the gap-depth defining layer 33 therebetween is reduced by reducing the thickness H3 of the gap-depth defining layer 33, the magnetic field is prone to leak between the lower core layer 20 and the upper magnetic layer 24. This reduces the field leakage from the recording-medium opposing surface.

Accordingly, in the present invention, the metal film 36 formed on the gap-depth defining layer 33 is made thick by stacking the underlying film 34 and the nonmagnetic metal film 35 formed by plating. When such a thick metal film 36 is formed on the gap-depth defining layer 33, an appropriate distance is ensured between the lower core layer 20 and the upper magnetic layer 24, and the magnetic field is prevented from leaking between the portions of the lower core layer 20 and the upper magnetic layer 24 with the gap-depth defining layer 33 therebetween. Since the magnetic field is properly cut off by the nonmagnetic metal film 35, and is prevented from leaking between the lower core layer 20 and the upper magnetic layer 24. It is preferable that the underlying film 34 be formed by sputtering a nonmagnetic metal material rather than by sputtering a magnetic metal material. This can prevent the magnetic field from leaking between the upper magnetic layer 24 and the underlying film 34.

Figure 9:
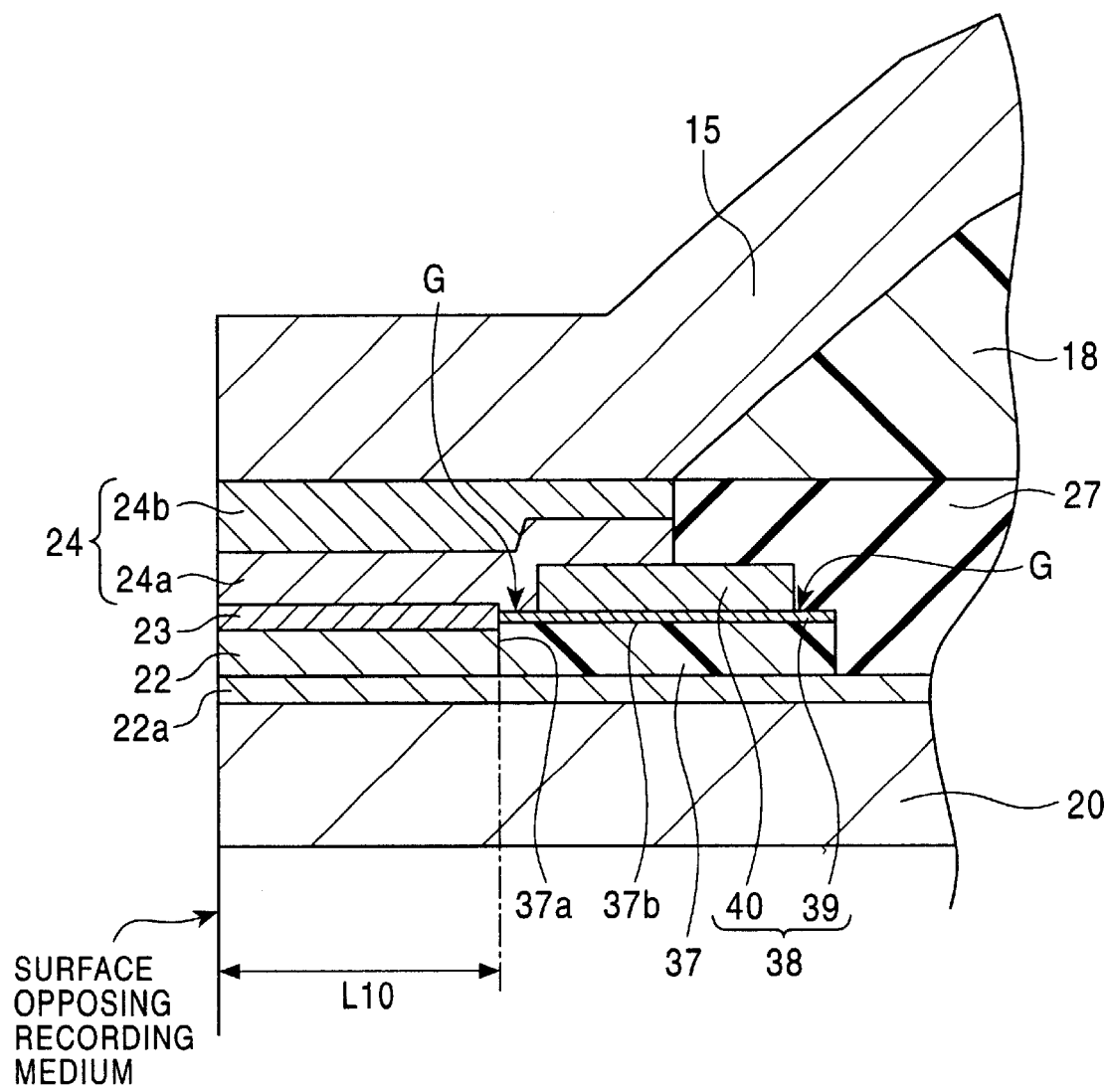
FIG. 9 is a partial longitudinal sectional view showing the portions near a surface of a thin-film magnetic head according to a sixth embodiment of the present invention which opposes a recording medium.

FIG. 9 is a partially enlarged longitudinal sectional view of a thin-film magnetic head according to a sixth embodiment of the present invention.

Referring to FIG. 9, a front end face 37a of a gap-depth defining layer 37 on the side of a recording-medium opposing surface vertically rises from a lower core layer 20 in the upward direction (in the Z-direction). The longitudinal cross section of the gap-depth defining layer 33 is substantially rectangular. The front end face 37a of the gap-depth defining layer 37 may be formed of an inclined face which is inclined upward from the lower core layer 20 in the height direction, and the longitudinal cross section of the gap-depth defining layer 37 may be substantially trapezoidal, as in FIG. 7.

An underlying film 39 of a metal film 38 is formed over the entire upper surface 37b of the gap-depth defining layer 37. It is preferable that the underlying film 39 be formed by sputtering a nonmagnetic metal material or a magnetic metal material, in a manner similar to that of the underlying film 34 of the metal film 36 shown in FIG. 8.

A nonmagnetic metal film 40 of the metal film 38 which is shorter than the underlying film 34 in the height direction (Y-direction) is formed by plating, and steps G are formed between the end faces of the nonmagnetic metal film 40 and the gap-depth defining layer 37 in the height direction. The nonmagnetic metal film 40 may be formed of a material similar to that of the nonmagnetic metal film 35 of the metal film 36 shown in FIG. 8.

The gap-depth defining layer 37 can be suitably formed so that its longitudinal cross section is substantially rectangular, as shown in FIG. 9, regardless of whether it is made of an organic material or an inorganic material.

A lower magnetic layer 22 is formed on the lower core layer 20 with a seed layer 22a therebetween by plating so that it extends between the recording-medium opposing surface and the front end face 37a of the gap-depth defining layer 37. Similarly, a gap layer 23 is formed on the lower magnetic layer 22 by plating so that it extends between the recording-medium opposing surface and the front end face 37a of the gap-depth defining layer 37. The gap depth (Gd) is defined by the length L10 between the recording-medium opposing surface to the point where the gap layer 23 abuts the front end face 37a.

A lower layer 24a of an upper magnetic layer 24 having a high saturation magnetic flux density is formed by plating so that it extends over the gap layer 23 and the metal film 38 formed on the gap-depth defining layer 37. An upper layer 24b having a lower saturation magnetic flux density than that of the lower layer 24a is formed on the lower layer 24a.

In this embodiment, the lower layer (high-Bs layer) 24a of the upper magnetic layer 24 can also be formed with a predetermined thickness by plating so that it extends onto the metal film 38 formed on the gap-depth defining layer 37. Therefore, a magnetic flux flowing from an upper core layer 15 to the upper magnetic layer 24 properly flows to the lower layer (high-Bs layer) 24a, which extends deep in the height direction and has a high saturation magnetic flux density, via the upper layer 24b. This can increase the magnetic field leaking from the recording-medium opposing surface. Consequently, it is possible to produce a thin-film magnetic head which can suitably respond to future increases in recording density.

As will be described in the following production method, the lower layer 24a of the upper magnetic layer 24 can be formed by plating so as to extend onto the metal film 38 formed on the upper surface of the gap-depth defining layer 37, and the thickness thereof can be made large. The upper layer 24b formed on the lower layer 24a can be suitably formed by plating, and the entire upper magnetic layer 24 can be formed with a predetermined thickness. This can properly prevent magnetic saturation in the upper magnetic layer 24. Furthermore, the positions of a rear edge (magnetic pole edge) 24d1 and an end portion 24c1 (from which the upper magnetic layer 24 increases in width in the height direction) of the upper magnetic layer 24 shown in FIG. 4 can be freely designed and changed in order to optimize the overwriting characteristics, which depend on the position of the rear edge 24d1, and NLTS and the pulse width at the 50% threshold, which depend on the position of the end portion 24c1. As a result, the degree of flexibility in design can be increased.

Since the rear end portion of the upper magnetic layer 24 can be formed with a sufficient volume on the gap-depth defining layer 37, the upper magnetic layer 24 can be formed in a predetermined shape, regardless of the accuracy of flattening.

The lower magnetic layer 22 is formed on the lower core layer 20 by plating, but is not formed by cutting the lower core layer 20, as in the related art shown in FIG. 35. Therefore, magnetic powder will not adhere to both side faces of the upper magnetic layer 24 in the height direction, and a trimming process for removing the magnetic powder is unnecessary. This can enhance the controllability of the track width.

Furthermore, the metal film 38 formed on the gap-depth defining layer 37 is made thick by stacking the underlying film 39 and the nonmagnetic metal film 40 formed by plating. By forming such a thick metal film 38 on the gap-depth defining layer 37, an appropriate distance is ensured between the lower core layer 20 and the upper magnetic layer 24, and the magnetic field leaking between the portions of the lower core layer 20 and the upper magnetic layer 24 with the gap-depth defining layer 37 can be reduced. The magnetic field is properly cut off by the nonmagnetic metal film 40, and is prevented from leaking between the lower core layer 20 and the upper magnetic layer 24.

Figure 10:
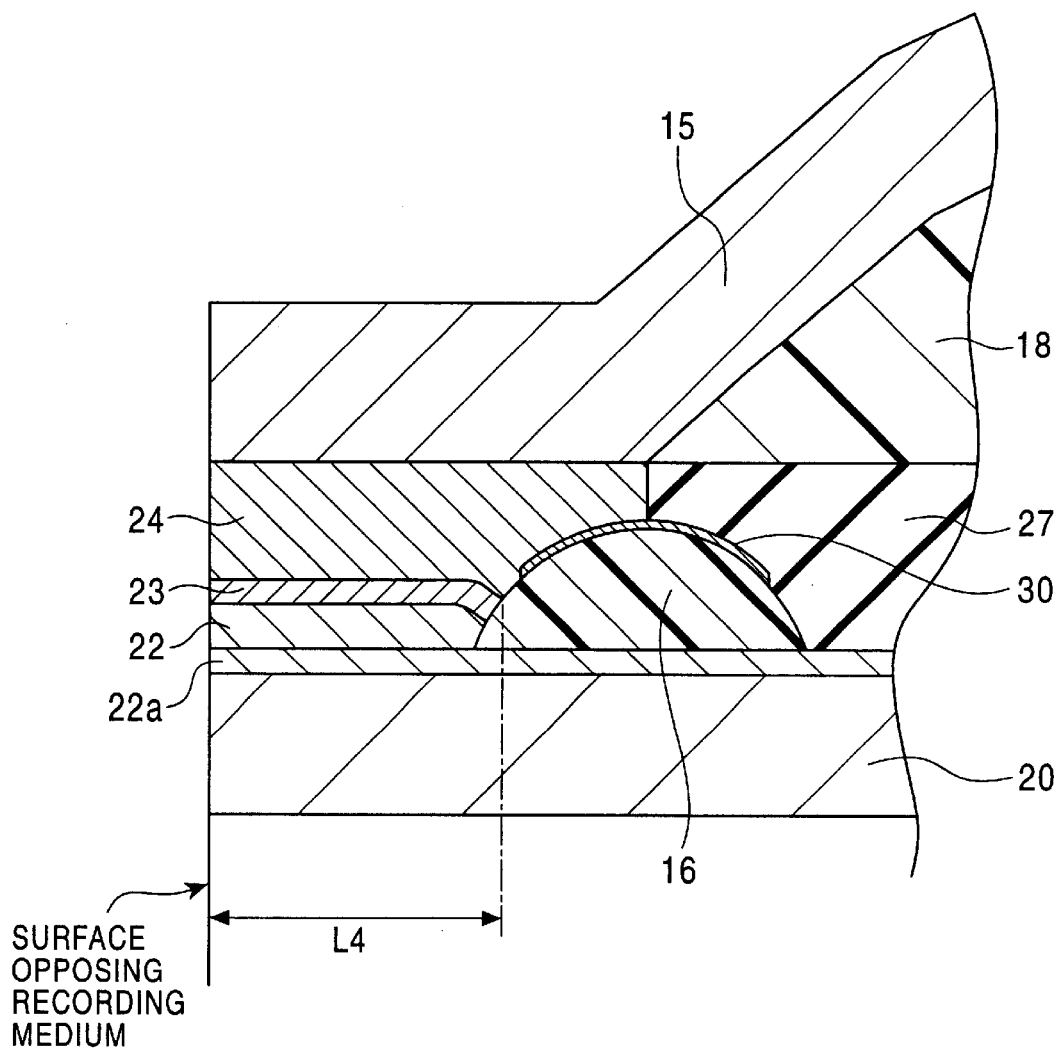
FIG. 10 is a partial longitudinal sectional view showing the portions near a surface of a thin-film magnetic head according to a seventh embodiment of the present invention which opposes a recording medium.

FIG. 10 is a partially enlarged longitudinal sectional view of a thin-film magnetic head according to a seventh embodiment of the present invention.

This embodiment is different from the first embodiment shown in FIG. 3 in that an upper magnetic layer 24 is formed of a single layer.

In this embodiment, the upper magnetic layer 24 can also be formed with a predetermined thickness by plating so that it extends onto a metal film 30 formed on the upper surface of a gap-depth defining layer 16. Therefore, magnetic saturation in the upper magnetic layer 24 can be properly prevented. The positions of a rear edge (magnetic pole edge) 24d1 and an end portion 24c1 (from which the upper magnetic layer 24 increases in width in the height direction) of the upper magnetic layer 24 shown in FIG. 4 can be freely designed and changed in order to optimize the overwriting characteristics, which depend on the position of the rear edge 24d1, and NLTS and the pulse width at the 50% threshold which depend on the position of the end portion 24c1. As a result, the degree of flexibility in design can be increased.

Since the rear end portion of the upper magnetic layer 24 can be formed with a sufficient volume on the gap-depth defining layer 16, the upper magnetic layer 24 can be formed in a predetermined shape, regardless of the accuracy of flattening.

The lower magnetic layer 22 is formed on the lower core layer 20 by plating, but is not formed by cutting the lower core layer 20, as in the related art shown in FIG. 35. Therefore, magnetic powder will not adhere to both side faces of the upper magnetic layer 24 in the height direction, and a trimming process for removing the magnetic powder is unnecessary. This can enhance the controllability of the track width.

Figure 11:
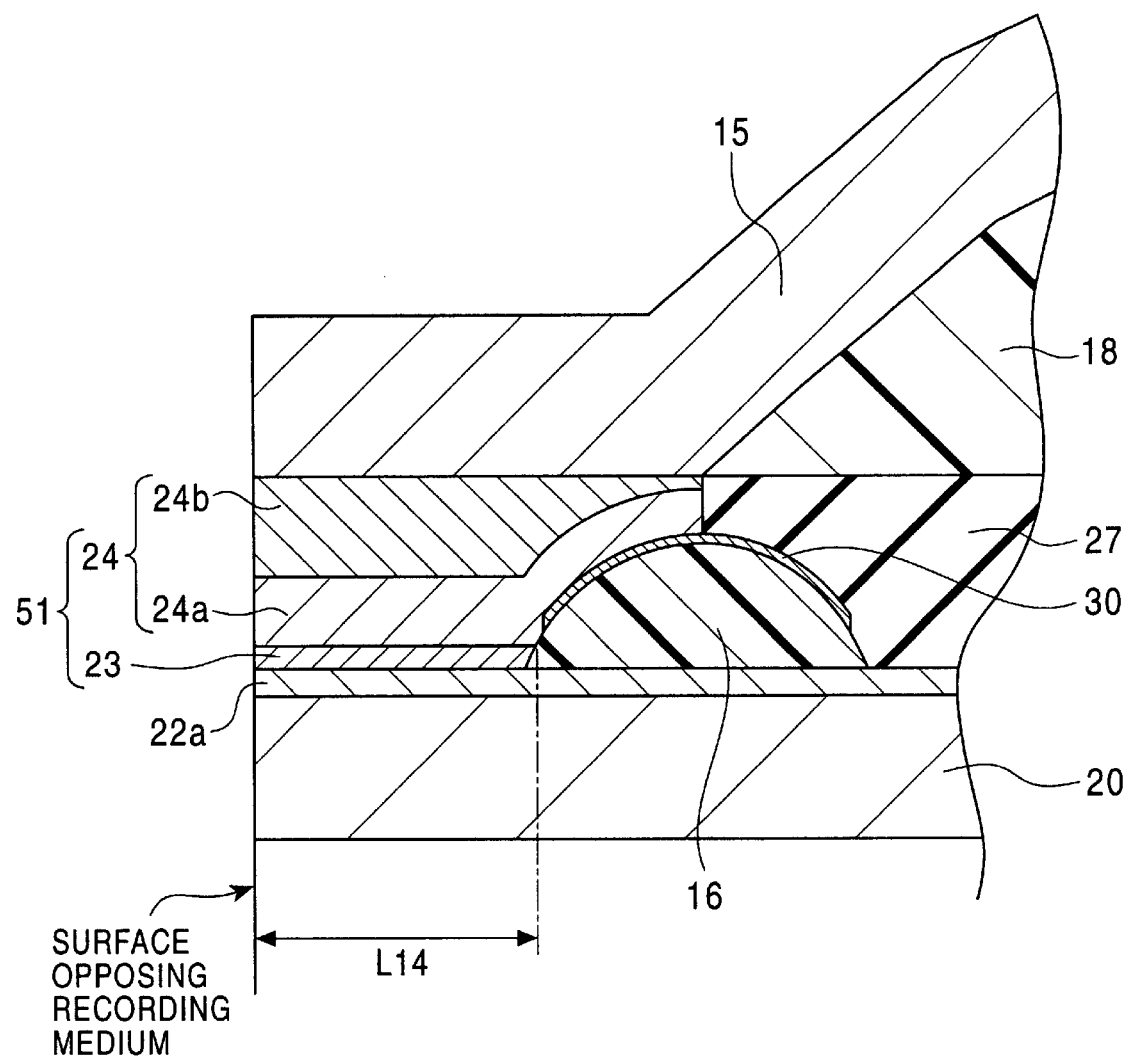
FIG. 11 is a partial longitudinal sectional view showing the portions of a surface of a thin-film magnetic head according to an eighth embodiment of the present invention which opposes a recording medium.

The manner in which the upper magnetic layer 24 is formed of a single layer is also applicable to the second embodiment shown in FIG. 5 and the following eighth embodiment shown in FIG. 11.

FIG. 11 is a partially enlarged longitudinal sectional view of a thin-film magnetic head according to an eighth embodiment of the present invention.

This embodiment is different from the second embodiment shown in FIG. 3 in that a pole section 50 has a two-layer structure composed of a gap layer 23 and an upper magnetic layer 24 and in that no lower magnetic layer 22 is formed.

The gap layer 23 is formed on a lower core layer 20 by plating so that it extends between a recording-medium opposing surface and a front end face 16a of a gap-depth defining layer 16. The gap depth (Gd) is defined by the length L4 between the recording-medium opposing surface and the front end face 16a where the gap layer 23 abuts the gap-depth defining layer 16.

Even when the pole section 50 has such a two-layer structure composed of the gap layer 23 and the upper magnetic layer 24, a lower layer 24a of the upper magnetic layer 24 having a high saturation magnetic flux density is formed by plating so that it extends over the gap layer 23 and a metal film 30 formed on the gap-depth defining layer 16.

In this embodiment, the lower layer (high-Bs layer) 24a of the upper magnetic layer 24 can also be formed with a predetermined thickness by plating so as to extend onto the metal film 30 formed on the gap-depth defining layer 16. Therefore, a magnetic flux flowing from an upper core layer 15 to the upper magnetic layer 24 properly flows to the lower layer (high-Bs layer) 24a, which extends deep in the height direction and has a high saturation magnetic flux density, via an upper layer 24b, and this can increase the leakage field generated from the recording-medium opposing surface. Consequently, it is possible to produce a thin-film magnetic head which can suitably respond to future increases in recording density.

As will be described in the following production method, the lower layer 24a of the upper magnetic layer 24 can be formed by plating so as to extend onto the metal film 30 formed on the upper surface of the gap-depth defining layer 16, and the thickness thereof can be made large. The upper layer 24b formed on the lower layer 24a can be suitably formed by plating, and the entire upper magnetic layer 24 can be formed with a predetermined thickness. This can properly prevent magnetic saturation in the upper magnetic layer 24. Furthermore, the positions of a rear edge (magnetic pole edge) 24d1 and an end portion 24c1 (from which the upper magnetic layer 24 increases in width in the height direction) of the upper magnetic layer 24 shown in FIG. 4 can be freely designed and changed in order to optimize the overwriting characteristics, which depend on the position of the rear edge 24d1, and NLTS and the pulse width at the 50% threshold, which depend on the position of the end portion 24c1. As a result, the degree of flexibility in design can be increased.

Since the rear end portion of the upper magnetic layer 24 can be formed with a sufficient volume on the gap-depth defining layer 16, the upper magnetic layer 24 can be formed in a predetermined shape, regardless of the accuracy of flattening.

In this embodiment, a lower magnetic layer may be formed by, for example, etching the lower core layer 20 by ion milling.

The structure of the pole section 50 shown in FIG. 11 is also applicable to the embodiments shown in FIGS. 3 to 10.

In all the embodiments shown in FIGS. 3 to 11, the seed layer 22a is formed between the lower magnetic layer 22 (the gap layer 23 in FIG. 11) and the lower core layer 20. Even when the seed layer 22a is not formed, the lower magnetic layer 22 (the gap layer 23 in FIG. 11) can be formed by plating with the surface of the lower core layer 20 used as a seed layer.

Since the metal film can be formed on the flat gap-depth defining layer in the embodiments shown in FIGS. 6 to 9, the upper surface of the upper magnetic layer 24 can be easily flattened, and the magnetic pole edge and the like can be positioned with high precision.

Next, the structures of the layers other than the gap-depth defining layer and the pole section will be described chiefly with reference to FIG. 2.

Referring to FIG. 2, an underlying insulating layer 27, which covers the gap-depth defining layer 16 and is in contact with the rear end face of the upper magnetic layer 24, is formed on the lower core layer 20 on the side further apart from the recording-medium opposing surface than the gap-depth defining layer 16 in the height direction. The surface of the underlying insulating layer 27 is flush with a joint surface between the upper magnetic layer 24 and the upper core layer 15 which serves as a reference plane A. The underlying insulating layer 27 is an inorganic insulating layer made of an inorganic material. It is preferable that at least one of $Al_2O_3$, $SiO_2$, $Ta_2O_5$, and AlN be selected as the inorganic material.

As shown in FIG. 2, a coil layer 17 made of, for example, Cu is formed in a spiral pattern centered on a coil center portion 17a on the underlying insulating layer 27 so as to induce a recording magnetic field in the upper core layer 15 and the lower core layer 20.

A coil insulating layer 18 is made of an organic material such as a resist or polyimide on the coil layer 17. The upper core layer 15 made of a magnetic material, such as permalloy, is formed on the coil insulating layer 18 by flame plating or the like.

A leading end portion 15a of the upper core layer 15 is in contact with the upper magnetic layer 24, and a base end portion 15b thereof is magnetically connected to a lifting layer (back gap layer) 19 made of a magnetic material on the lower core layer 20. The upper surface of the lifting layer 19 is flush with the reference plane A as well as the underlying insulating layer 27. In the thin-film magnetic head shown in FIG. 2, the lifting layer 19 is made of the same material as that of the lower core layer 20 or the upper core layer 15. The lifting layer 19 may be formed of a single-layer film or a multilayer film made of a magnetic metal material different from the material of the lower core layer 20 or the upper core layer 15.

The lifting layer 19 may be omitted. In this case, the base end portion 15b of the upper core layer 15 extends onto the lower core layer 20 so that it is directly and magnetically connected to the lower core layer 20. As shown in FIG. 1, the width T3 of the leading end portion 15a of the upper core layer 15 is set to be more than the track width Tw.

The coil center portion 17a and an end portion 17c of the coil layer 17 are electrically connected to a lifting layer 29 made of the same material as that of the lifting layer 19. The upper surface of the lifting layer 29 is flush with the reference plane A as well as the underlying insulating layer 27.

In the thin-film magnetic head shown in FIG. 2, the lifting layer 29 is made of the same material as that of the lower core layer 20 or the upper core layer 15. The lifting layer 29 may be formed of a single-layer film or a multilayer film made of a magnetic metal material different from the material of the lower core layer 20 or the upper core layer 15.

The lifting layer 29 need not always be made of a magnetic material, but may be made of a highly conductive material, such as Cu, in a manner similar to that of the coil layer 17.

The lifting layer 29 is connected to an extraction electrode layer 28 with the seed layer 22a therebetween. The extraction electrode layer 28 is formed simultaneously with the lower core layer 20, and is made of the same material as that of the lower core layer 20. The extraction electrode layer 28 need not always be made of the same material as that of the lower core layer 20.

The lifting layer 29 may be omitted. In this case, the coil center portion 17a and the end portion 17c of the coil layer 17 extend onto the extraction electrode layer 28 so as to be directly and electrically connected to the extraction electrode layer 28.

In the present invention, it is preferable that the coil layer 17 include a conductive material layer 25 made of Cu or the like, and a conductive protective layer 26 formed thereon and made of Ni or the like.

By making the conductive material layer 25 of Cu, the coil resistance can be decreased, and the allowable electric current can be increased. The material of the conductive material layer 25 is not limited to Cu, and the conductive material layer 25 may have a single-layer or multilayer structure including one or both of the elements Cu and Au.

The conductive protective layer 26 may be formed of a highly oxidation-resistant conductive layer which has a single-layer or multilayer structure including at least one of the elements Ni, P, Pd, Pt, B, Au, and W.

As shown in FIG. 2, the coil insulating layer 18 is formed on the coil layer 17. An upper surface 17b of the coil layer 17 is sometimes exposed to the atmosphere before the coil insulating layer 18 is formed thereon. In this case, when the coil layer 17 consists of only the conductive material layer 25 of Cu or the like, the surface of the conductive material layer 25 is oxidized, the adhesion to, for example, the coil insulating layer 18 shown in FIG. 2, is decreased, and stripping or the like occurs.

Such oxidation coil unstable, and degrades the recording characteristics.

For this reason, the conductive protective layer 26 made of, for example, Ni for protecting the conductive material layer 25 from oxidation is formed on the conductive material layer 25 made of Cu or the like in the present invention. This makes it possible to properly prevent the conductive material layer 25 from being oxidized before the coil insulating layer 18 is formed.

It is preferable that the thickness of the conductive protective layer 26 be approximately 0.5 μm. The conductive protective layer 26 made of Ni or the like may also be oxidized when exposed to the atmosphere. When the conductive protective layer 26 is made of, for example, Ni, an oxidized layer formed thereon is approximately 3.0 nm in thickness. Therefore, in a case in which the conductive protective layer 26 is made approximately 200 nm to 600 nm in thickness, even when the oxidized layer is removed by ion milling or by other means, the conductive material layer 25 is not directly affected by ion milling, and the cross sectional area thereof can be prevented from being changed.

It is preferable that the conductive material layer 25 and the conductive protective layer 26 be continuously formed by plating. In the present invention, the conductive protective layer 26 may be replaced with a protective layer made of a nonconductive insulating material such as $SiO_2$. The protective layer may be formed by sputtering or by other means.

A thin-film magnetic head production method according to the present invention will be described below. FIGS. 12 to 29 are partial longitudinal sectional views showing the processes of the production method. The following description will be mainly given of a method for forming the gap-depth defining layer and the pole section.

FIGS. 12 to 19 show a first thin-film magnetic head production method according to the present invention. In this production method, multiple thin-film magnetic heads are formed on a wafer, cut, and then polished. For example, in a case in which discrete thin-film magnetic heads are produced through the above forming, cutting, and polishing processes while a predetermined surface of the wafer is used as a surface opposing a recording medium (virtual surface), they are cut and polished at the surface. In the following thin-film magnetic head production method, the surface opposing the recording medium will be referred to as a "recording-medium opposing surface".

Figure 12:
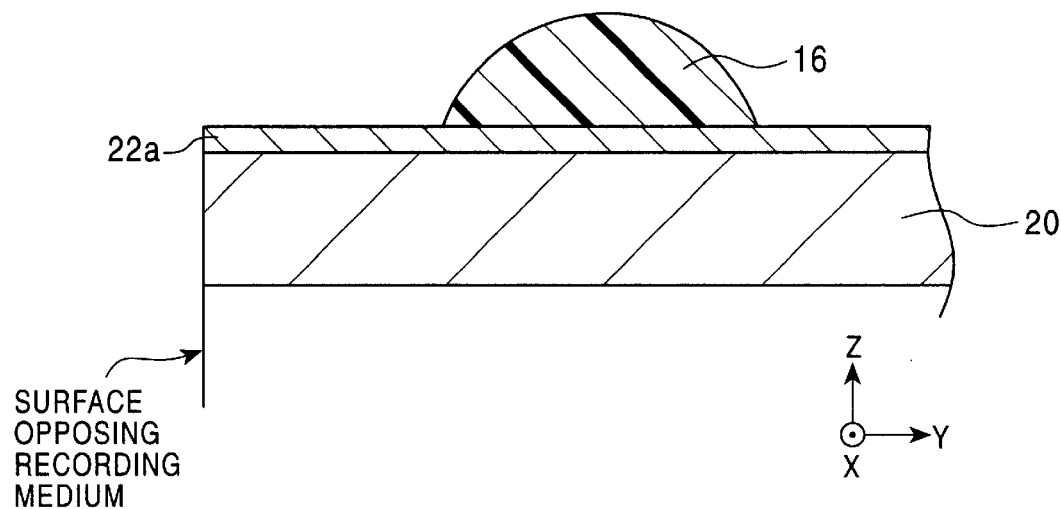
FIG. 12 is an explanatory view showing a step in a production method for the thin-film magnetic head shown in FIG. 3.

In a step shown in FIG. 12, a lower core layer 20 made of a magnetic material, such as a NiFe alloy, is formed by plating, and a seed layer 22a is then formed on the lower core layer 20 by sputtering. While the seed layer 22a may be omitted, preferably, it is made of a magnetic metal material.

A gap-depth defining layer 16 made of a resist material, such as ultraviolet curing resin, is formed on the seed layer 22a and at a predetermined distance from the recording-medium opposing surface in the height direction (Y-direction in the figure). It is preferable that the gap-depth defining layer 16 be initially formed in a rectangular shape, and be approximately 1.0 µm in thickness. Next, the gap-depth defining layer 16 is heat-treated to cause sagging on the surface thereof, and is cured by irradiation with ultraviolet rays. The surface of the gap-depth defining layer 16 is thereby rounded, and the longitudinal cross section thereof is made substantially semielliptical.

Figure 13:
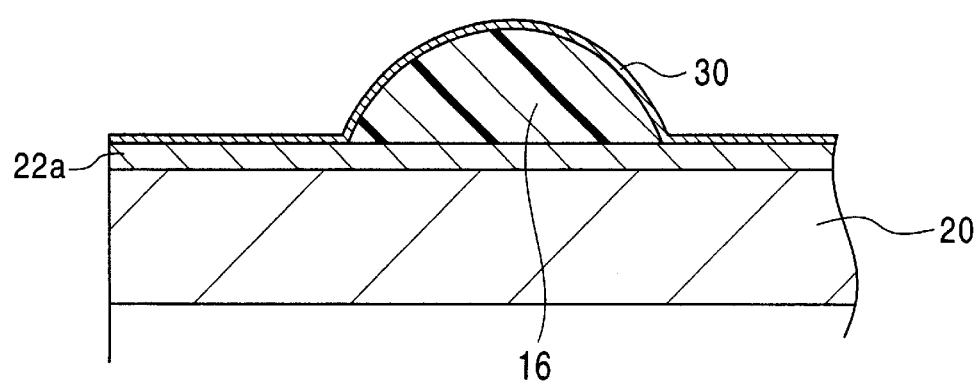
FIG. 13 is an explanatory view showing a step subsequent to the step shown in FIG. 12.

In a step shown in FIG. 13, a metal film 30 is formed over the seed layer 22a formed on the lower core layer 20 and the gap-depth defining layer 16. The metal film 30 may be made of a nonmagnetic metal material or a magnetic metal material. When the metal film 30 is made of a nonmagnetic metal material, it is preferable that at least one of Cu, Au, Cu—Ni, Pt, and Ti be selected as the nonmagnetic metal material. It is preferable to first apply Ti and to then apply at least one of Cu, Au, Cu—Ni, and Pt in order to enhance the adhesion.

When the metal film 30 is made of a magnetic metal material, it is preferable to select as the magnetic metal material a NiFe alloy, a CoFe alloy, a CoFeNi alloy, or the like.

It is preferable that the metal film 30 be formed by sputtering. This allows the metal film 30 to be suitably formed on the gap-depth defining layer 16. By forming the metal film 30 by sputtering, the thickness thereof is reduced to approximately 0.05 µm to 0.1 µm. In a case in which the metal film 30 is made of a magnetic material having a high Ni concentration, it may melt when plated with an upper magnetic layer 24 in a subsequent step. For this reason, when the metal film 30 is made of a magnetic material having a high Ni concentration, it is preferable that the thickness of the metal film 30 be rather large. More specifically, it is preferable that the thickness be 0.1 µm to 0.3 µm.

Figure 14:
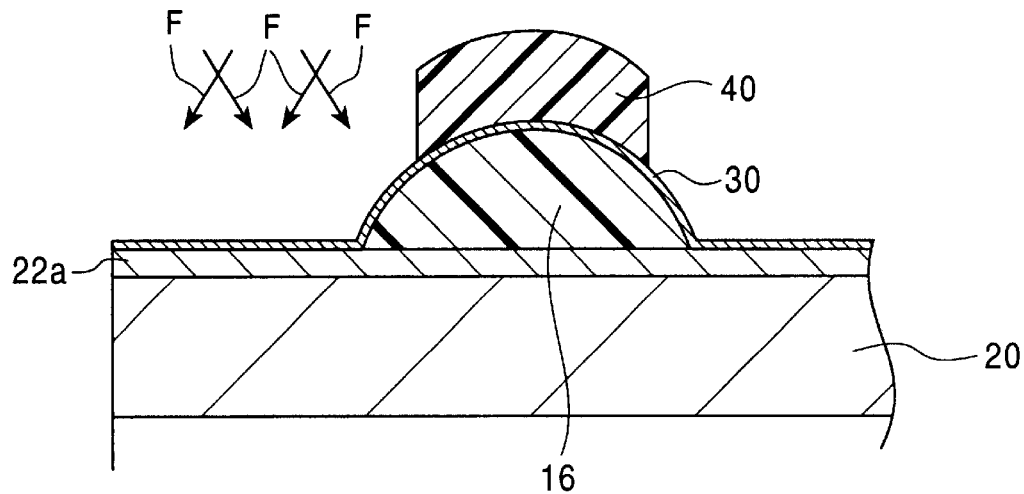
FIG. 14 is an explanatory view showing a step subsequent to the step shown in FIG. 13.

After a resist layer 40 is formed over the entire metal film 30 formed on the gap-depth defining layer 16, it is subjected to exposure and development so that a part thereof is left on the metal film 30 formed on the gap-depth defining layer 16 (see FIG. 14). In this case, at least a part of the metal film 30 formed on a front end face 16a of the gap-depth defining layer 16 is not covered with the resist layer 40.

Then, the metal film 30 which is not covered with the resist layer 40 is removed by being subjected to ion milling or dry etching, such as RIE, from the directions of arrows F. The metal film 30 is thereby left only adjacent to the upper surface of the gap-depth defining layer 16, and the front end face 16a of the gap-depth defining layer 16 is exposed (see FIG. 15).

Figure 15:
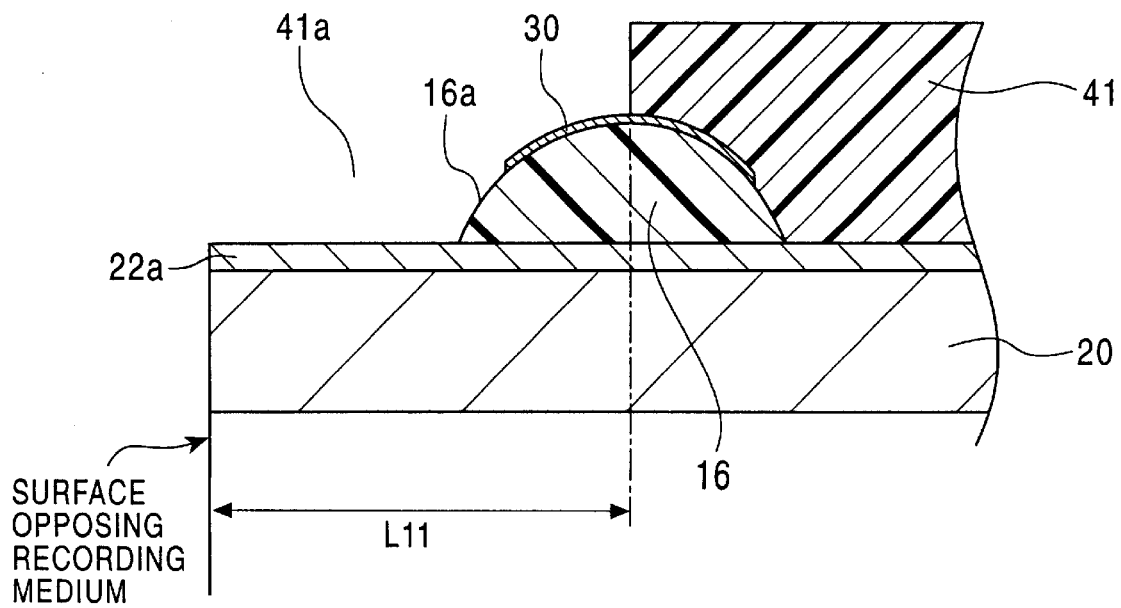
FIG. 15 is an explanatory view showing a step subsequent to the step shown in FIG. 14.

In a step shown in FIG. 15, a resist layer 41 formed over the seed layer 22a and the gap-depth defining layer 16, and is subjected to exposure and development, thereby forming a pole-section forming groove 41a having a predetermined length L11 from the recording-medium opposing surface in the height direction (Y-direction). The length L11 is determined so that the gap-depth defining layer 16 and the metal film 30 formed thereon are partly exposed through the pole-section forming groove 41a.

Figure 16:
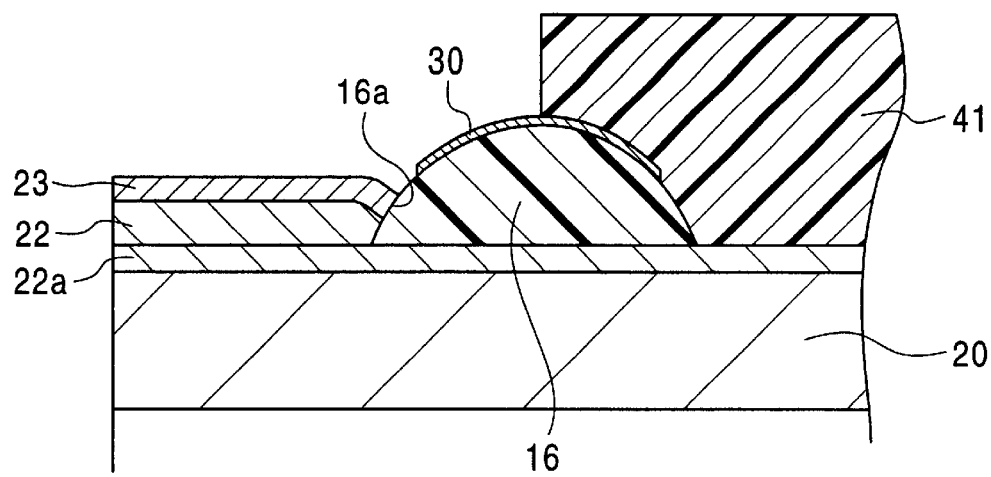
FIG. 16 is an explanatory view showing a step subsequent to the step shown in FIG. 15.

In a step shown in FIG. 16, a lower magnetic layer 22 is formed on the seed layer 22a inside the pole-section forming groove 41a by plating. In this case, the lower magnetic layer 22 is formed while properly adjusting the thickness thereof so that its rear end is in contact with the front end face 16a of the gap-depth defining layer 16 and so that it does not touch the metal film 30 formed on the gap-depth defining layer 16. If the lower magnetic layer 22 extends onto the metal film 30, the magnetic field leaks between the extended portion of the lower magnetic layer 22 and an upper magnetic layer 24, and the magnetic field leaking from the recording-medium opposing surface is reduced. Moreover, the gap depth is increased, and cannot easily fall within a predetermined range.

A gap layer 22 is formed on the lower magnetic layer 22 by plating. It is preferable that the gap layer 23 be made of at least one of nonmagnetic metal materials NiP, NiPd, NiW, NiMo, Au, Pt, Rh, Pd, Ru, Cr, and Ti.

When the gap layer 23 is made of a NiP alloy, continuous plating during production is easy, the heat resistance is high, and the adhesion to the lower magnetic layer 22 and the upper magnetic layer 24 is superior.

It is preferable that the gap layer 23 be made of a NiP alloy having a P concentration within the range of 8% by mass to 15% by mass. This allows the gap layer 23 to be stably kept nonmagnetic without being affected by external factors, such as heat generation.

The alloy composition of the gap layer 23 made of a NiP alloy or the like can be measured by, for example, an X-ray analyzer or a wavelength dispersive X-ray analysis system combined with an SEM, a TEM, or the like.

While the gap layer 23 extends to the front end face 16a of the gap-depth defining layer 16 which is placed offset from the metal film 30 formed on the gap-depth defining layer 16 toward the recording-medium opposing surface in the step shown in FIG. 16, it may extend onto the metal film 30. When the gap layer 23 is formed over the entire metal film 30 exposed inside the pole-section forming groove 41a, the thin-film magnetic head is completed, as shown in FIG. 5. The gap layer 23 need not always be formed over the entire exposed metal film 30, but may extend onto a part of the metal film 30.

Figure 17:
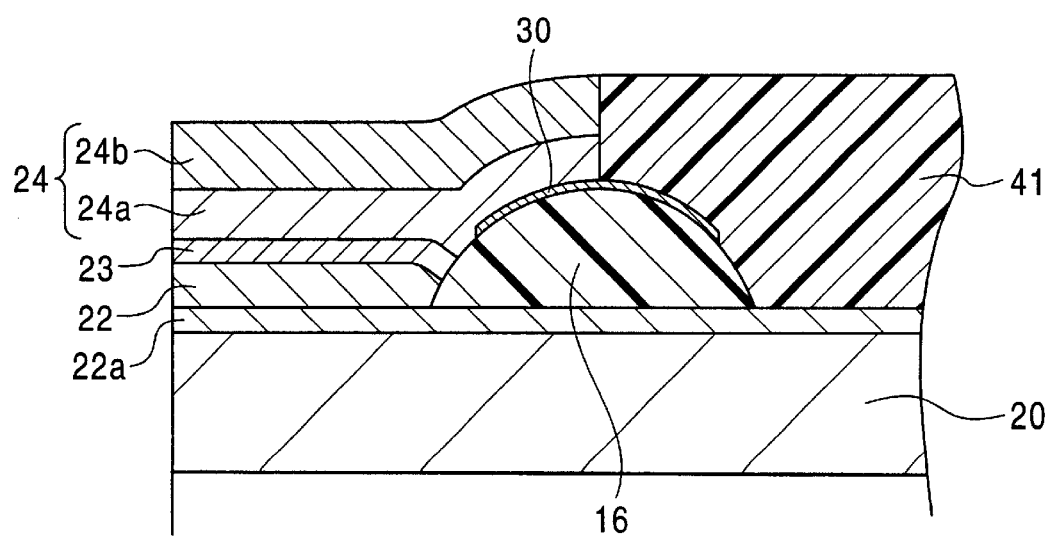
FIG. 17 is an explanatory view showing a step subsequent to the step shown in FIG. 16.

In a step shown in FIG. 17, the gap layer 23 is plated with a lower layer 24a which constitutes the upper magnetic layer 24 and has a high saturation magnetic flux density. Further, the lower layer 24a is extended onto the metal film 30 formed on the gap-depth defining layer 16.

In the present invention, since the metal film 30 is formed on the gap-depth defining layer 16, the lower layer 24a of the upper magnetic layer 24 can be deposited on the metal film 30 with the metal film 30 used as a seed layer.

Therefore, the lower layer 24a of the upper magnetic layer 24 can be formed with a predetermined thickness over the gap layer 23 and the portion of the gap-depth defining layer 16 exposed in the pole-section forming groove 41a.

In the step shown in FIG. 17, the lower layer 24a of the upper magnetic layer 24 is plated with an upper layer 24b having a lower saturation magnetic flux density than that of the lower layer 24a, and the resist layer 41 is then removed.

Figure 18:
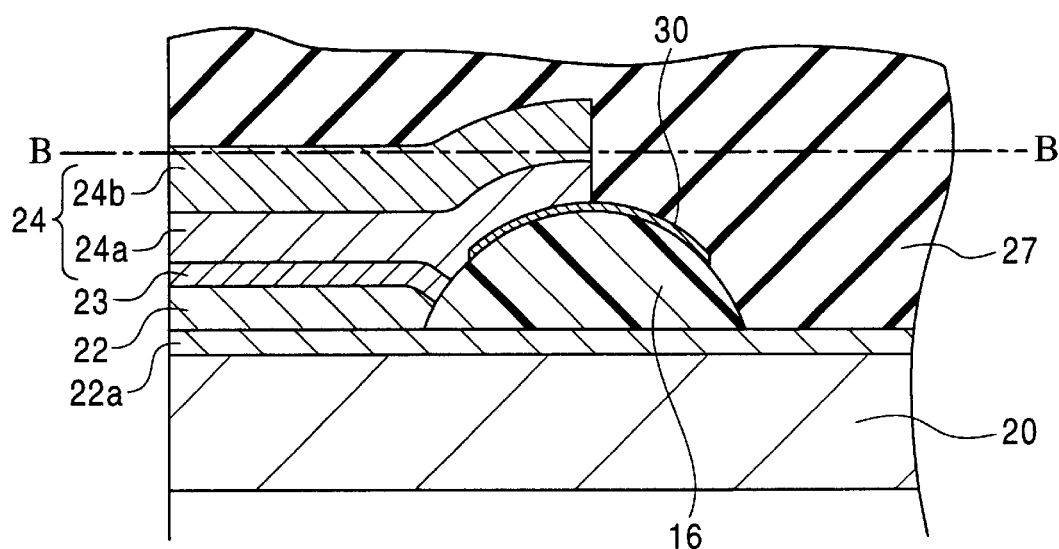
FIG. 18 is an explanatory view showing a step subsequent to the step shown in FIG. 17.

In a step shown in FIG. 18, an underlying insulating layer 27 made of an inorganic material, such as $Al_2O_3$ or $SiO_2$, is formed over the upper magnetic layer 24 and the seed layer 22a formed on the lower core layer 20 behind the upper magnetic layer 24 in the height direction.

Next, the underlying insulating layer 27 is ground to line B—B by, for example, CMP (Chemical Mechanical Polishing). By this grinding step, the upper layer 24b of the upper magnetic layer 24 is exposed so that the upper surface thereof is flush with the upper surface of the underlying insulating layer 27.

Figure 19:
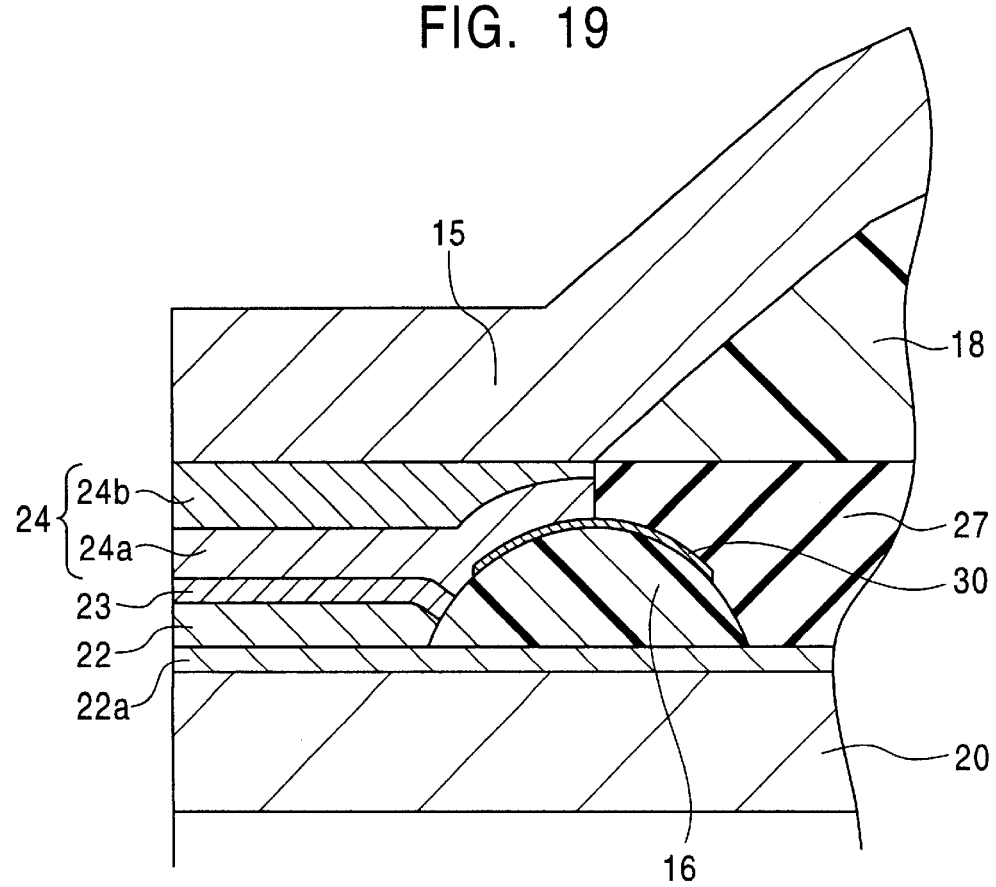
FIG. 19 is an explanatory view showing a step subsequent to the step shown in FIG. 18.

In the final step shown in FIG. 19, a coil layer 17 shown in FIG. 2 s patterned on the underlying insulating layer 27 and is covered with an insulating layer 18 made of an organic insulating material, such as a resist, and an upper core layer 15 is formed over the upper magnetic layer 24 and the insulating layer 27 by, or example, flame plating. Through the above steps, the thin-film magnetic head shown in FIGS. 2 and 3 is completed.

Figure 20:
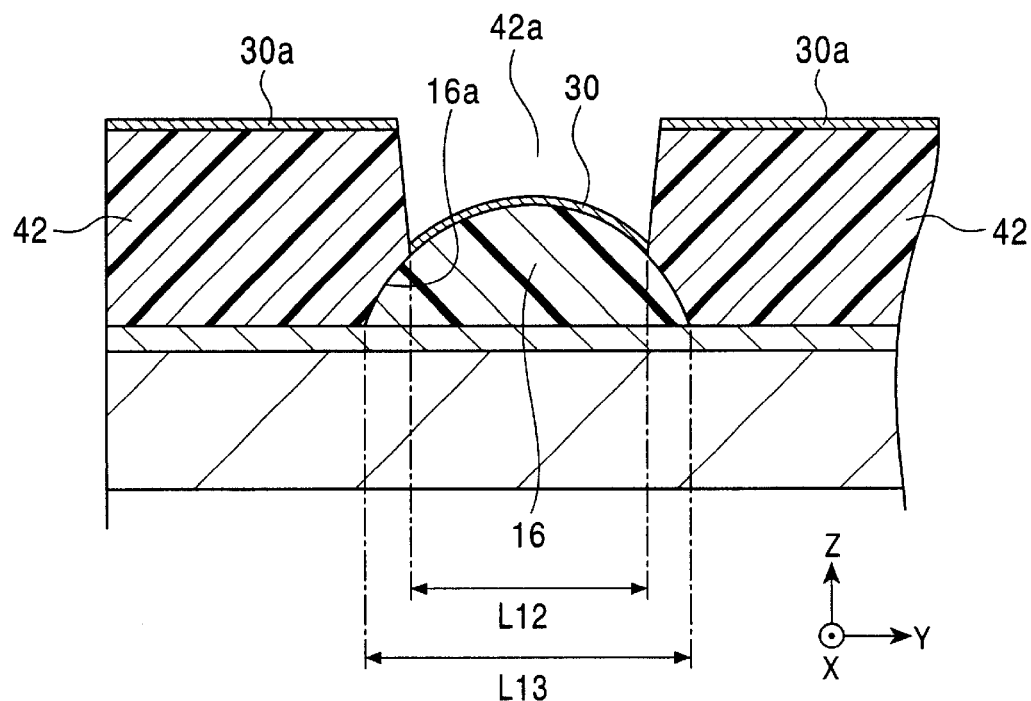
FIG. 20 is an explanatory view showing a step which can be substituted for the steps shown in FIGS. 13 and 14.

In the present invention, the gap-depth defining layer 16 may be formed by performing a step shown in FIG. 20 after the step shown in FIG. 12.

Referring to FIG. 20, a resist layer 42 is formed over the gap-depth defining layer 16 and the lower core layer 20, and is subjected to exposure and development so as to remove a portion of the resist layer 42 placed on the gap-depth defining layer 16, thereby forming a hole 42a in the resist layer 42. The length L12 of the hole 42a in the height direction is set to be less than the length L13 of the lower surface of the gap-depth defining layer 16 in the height direction so that at least a front end face 16a of the gap-depth defining layer 16 is covered with the resist layer 42.

A metal film 30 made of a nonmagnetic or magnetic metal material is formed on the portion of the gap-depth defining layer 16 exposed in the hole 42a by sputtering. In this case, a film 30a of a metal material is also formed on the resist layer 42 by sputtering. By removing the resist layer 42, the same gap-depth defining layer 16 as that in FIG. 15 is completed. Subsequent steps are the same as those in FIGS. 15 to 19.

FIGS. 21 to 24 show a second production method for the gap-depth defining layer according to the present invention.

Figure 21:
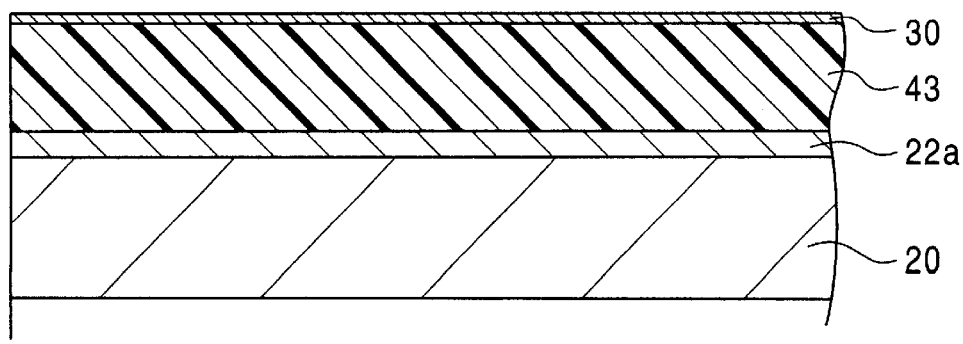
FIG. 21 is an explanatory view showing a step in a production method for the thin-film magnetic head shown in FIG. 6.

In a step shown in FIG. 21, a seed layer 22a is formed on a lower core layer 20 by sputtering, and a resist material layer 43 made of a resist material, such as ultraviolet curing resin, is formed on the seed layer 22a. In this case, the thickness of the resist material layer 43 is set at approximately 0.4 $\mu$m. A metal film 30 is further formed on the resist material layer 43. In the present invention, the resist material layer 43 may be replaced with an inorganic material layer made of an inorganic material, such as $Al_2O_3$ or $SiO_2$.

This second production method includes a step of removing a part of the resist material layer 43 by etching. In the etching step, the resist material layer 43 can be precisely worked into a predetermined shape. Even when the inorganic material layer is substituted for the resist material layer 43, it can be precisely worked into a predetermined shape. Alternatively, the resist material layer 43 may be replaced with another organic material layer.

In this production method, after the resist layer 43 is formed, it is heat-treated and is cured by irradiation with ultraviolet rays.

While the metal film 30 may be made of a nonmagnetic metal material or a magnetic metal material, it is preferable in both cases that the metal film 30 be formed by sputtering. This allows the metal film 30 to be formed with a predetermined thickness over the entire resist material layer 43. It is preferable to select as the nonmagnetic metal material at least one of Cu, Ni—Cu, Au, Pt, and Ti, and to select as the magnetic metal material a NiFe alloy, a CoFe alloy, or CoFeNi alloy. It is preferable to set the thickness of the metal film 30 at approximately 0.1 $\mu$m to 0.2 $\mu$m. When the metal film 30 is made of a magnetic metal material having a high Ni concentration, it is preferable to set the thickness of the metal film 30 at 0.1 $\mu$m to 0.3 $\mu$m. In a case in which the metal film 30 has the thickness within the range, even when it melts when plated with an upper magnetic layer 24, it can properly function as a seed layer.

Figure 22:
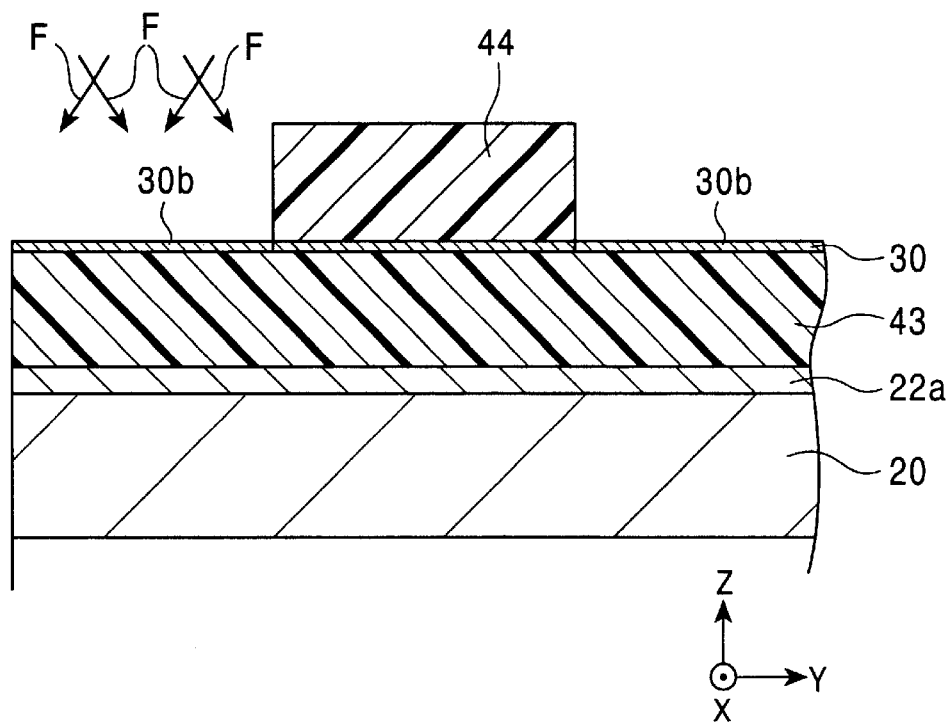
FIG. 22 is an explanatory view showing a step subsequent to the step shown in FIG. 21.

As shown in FIG. 22, a resist layer 44 having a predetermined length in the height direction is formed on the resist material layer 43 at a predetermined distance from the recording-medium opposing surface in the height direction. The length in the height direction (X-direction in the figure) of the resist layer 44 corresponds to the length in the height direction of the upper surface of a gap-depth defining layer formed in a subsequent step.

A portion of the metal film 30 which is not covered with the resist layer 44 is removed by performing ion milling or RIE from the F-direction. Subsequently, the resist layer 44 is removed.

Figure 23:
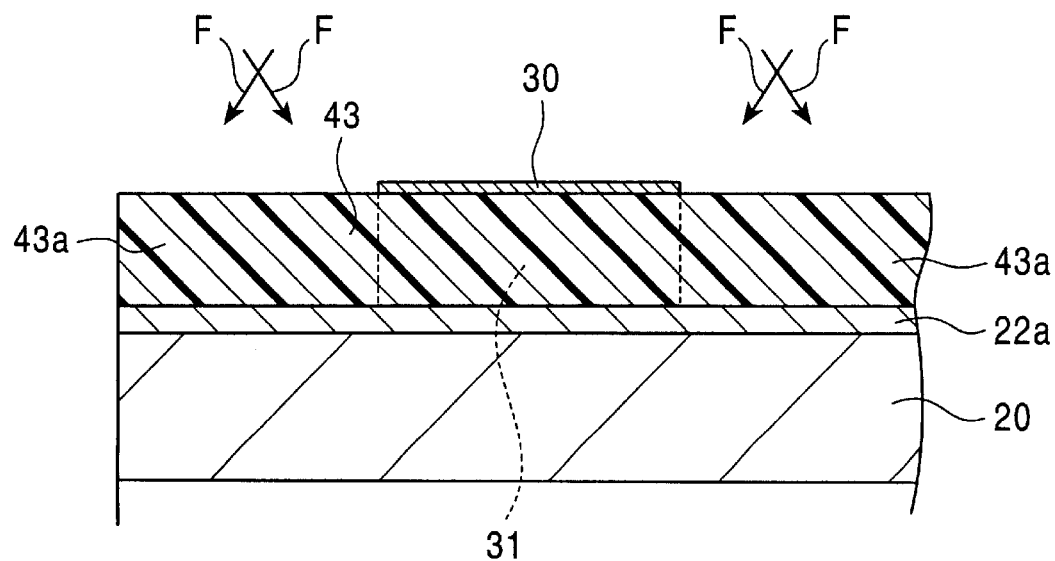
FIG. 23 is an explanatory view showing a step subsequent to the step shown in FIG. 22.

FIG. 23 shows that state. In a step shown in FIG. 23, a portion of the resist material layer 43a which is not covered with the metal film 30 is removed by ion milling or RIE from the F direction with a portion of the metal film 30 remaining on the resist material layer 43 used as a mask. Since the metal film 30 has a lower etching rate than that of the resist material layer 43a, it is hardly etched by ion milling. As a result, a part of the resist material layer 43 is left under the metal film 30 so as to serve as a gap-depth defining layer 31. In this production method, a front end face 31a of the gap-depth defining layer 31 on the side of a recording-medium opposing surface vertically rises from the lower core layer 20, and the longitudinal cross section of the gap-depth defining layer 31 is substantially rectangular. It is prone to depend on the shape of the metal film 30 serving as the mask whether or not the longitudinal cross section of the gap depth-defining layer 31 is substantially rectangular.

Figure 24:
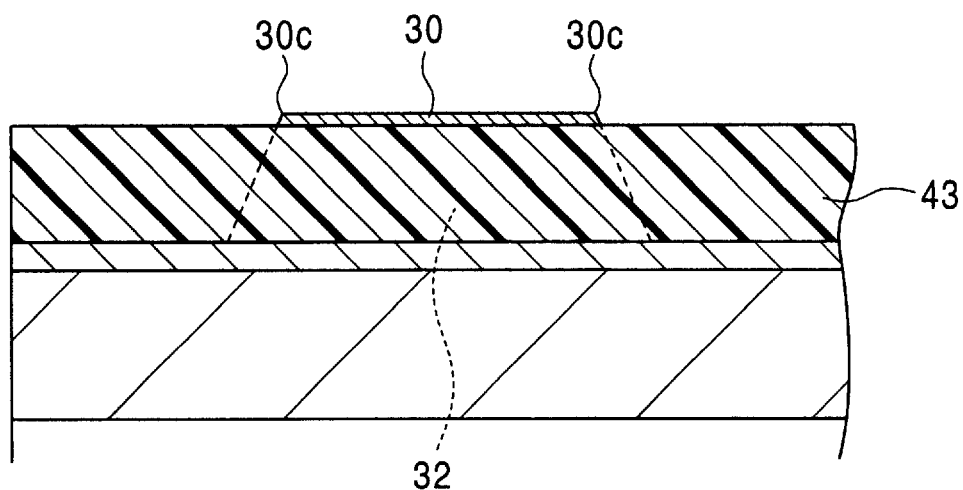
FIG. 24 is an explanatory view showing a step which can be substituted for the step shown in FIG. 23.

For example, as shown in FIG. 24, when the longitudinal cross section of the metal film 30 remaining on the resist material layer 43 is substantially trapezoidal, the longitudinal cross section of a gap-depth defining layer 32 which is protected by the metal film 30 from ion milling and finally remains is apt to also be substantially trapezoidal.

The thin-film magnetic head including the gap-depth defining layer 31 of substantially rectangular longitudinal cross section, as shown in FIG. 23, finally has the structure shown in FIG. 6, and the thin-film magnetic head including the gap-depth defining layer 32 of substantially trapezoidal longitudinal cross section, as shown in FIG. 24, finally has the structure shown in FIG. 7.

While the metal film 30b which is not covered with the resist layer 44 serving as the mask is removed, and the resist layer 44 is then removed in the process shown in FIG. 22, for example, the metal film 30b and the resist material layer 43a formed thereunder may be continuously removed by etching without removing the resist layer 44.

Figure 25:
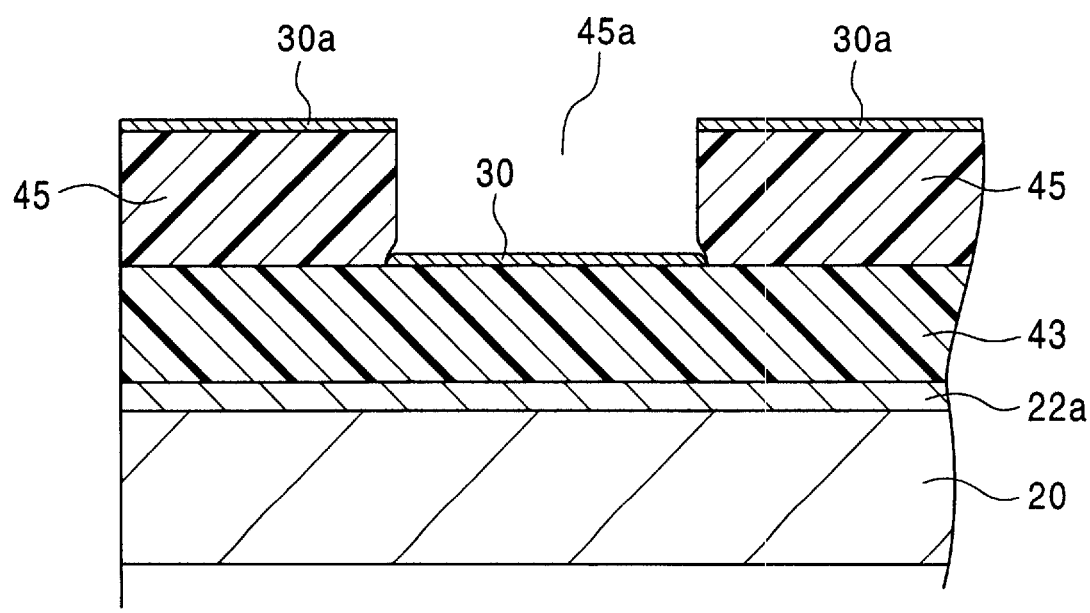
FIG. 25 is an explanatory view showing a step which can be substituted for the steps shown in FIGS. 21 and 22.

The metal film 30 may be formed through a step shown in FIG. 25, instead of the step shown in FIG. 21.

In a step shown in FIG. 25, a seed layer 22a is formed on a lower core layer 20 by sputtering, and a resist material layer 43 made of, for example, ultraviolet curing resin is formed on the seed layer 22a. The resist material layer 43 is heat-treated, and is cured by irradiation with ultraviolet lays.

Subsequently, a resist layer 45 is formed over the entire resist material layer 43. A hole 45a having a predetermined length in the height direction is formed in a portion of the resist layer 45 at a predetermined distance in the height direction from the recording-medium opposing surface by exposure and development, so that the surface of the resist material layer 43 is exposed through the hole 45a. Then, a metal film 30 made of a nonmagnetic or magnetic metal material is formed in the hole 45a by sputtering. In this case, a film 30a of a metal material is also formed on the resist layer 45 by sputtering. By removing the resist layer 45, the metal film 30 is left on the resist material layer 43, as shown in FIG. 23 or 24. The subsequent step is the same as that in FIG. 23 or 24.

In the present invention, after the gap-depth defining layer 31 or 32 and the metal film 30 of a substantially rectangular or substantially trapezoidal longitudinal cross section are formed on the lower core layer 20, the same steps as the above-described steps shown in FIGS. 15 to 19 are performed.

That is, a lower magnetic layer 22 is formed on the lower core layer 20 by plating. In this case, the thickness of the lower magnetic layer 22 is adjusted so that the lower magnetic layer 22 does not touch the metal film 30, and the lower magnetic layer 22 is joined to a front end face 31a or 32a of the gap-depth defining layer 31 or 32 on which the metal film 30 is not formed. Subsequently, a gap layer 23 is formed on the lower magnetic layer 22 by plating, a lower layer 24a which constitutes an upper magnetic layer 24 and has a high saturation magnetic flux density is formed on the gap layer 23 by plating so that it extends onto the metal film 30 on the gap-depth defining layer 31 or 32. After an upper layer 24b having a lower saturation magnetic flux density than that of the lower layer 24a is formed on the lower layer 24a by plating, an underlying insulating layer 27 is deposited and is flattened by CMP or the like, a coil layer 17 is formed, and an upper core layer 15 is formed.

It is preferable that the resist material layer 43 be thin, that is, have a thickness of approximately 0.4 μm. In this case, when the unnecessary resist material layer 43a is removed by etching, the resist will not accumulate between the front end face of the remaining gap-depth defining layer 31 or 32 and the lower core layer 20. This makes it possible to suitably form the lower magnetic layer 22, the gap layer 23, and the upper magnetic layer 24 on the lower core layer 20 by plating.

Figure 26:
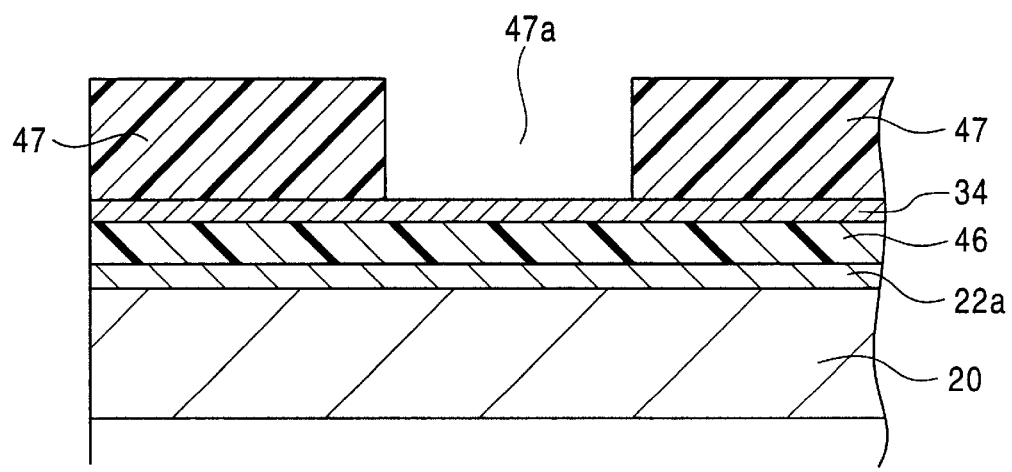
FIG. 26 is an explanatory view showing a step in a production method for the thin-film magnetic head shown in FIG. 8.
Figure 27:
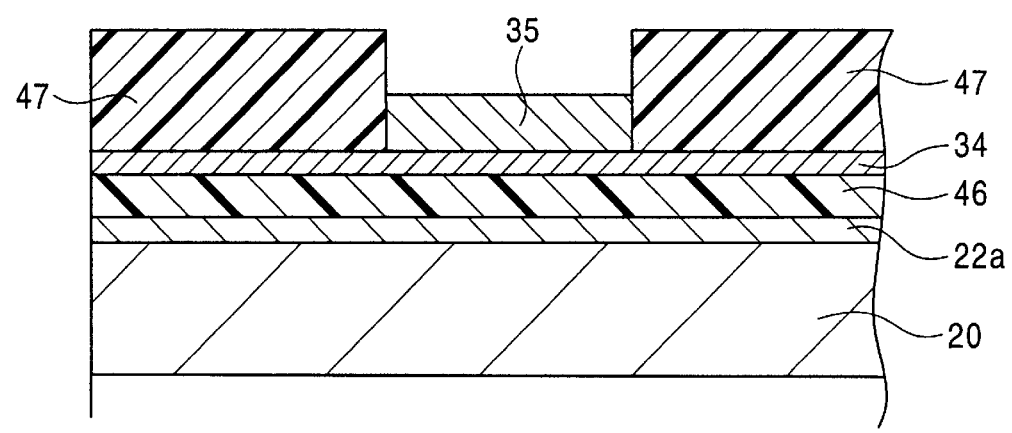
FIG. 27 is an explanatory view showing a step subsequent to the step shown in FIG. 26.
Figure 28:
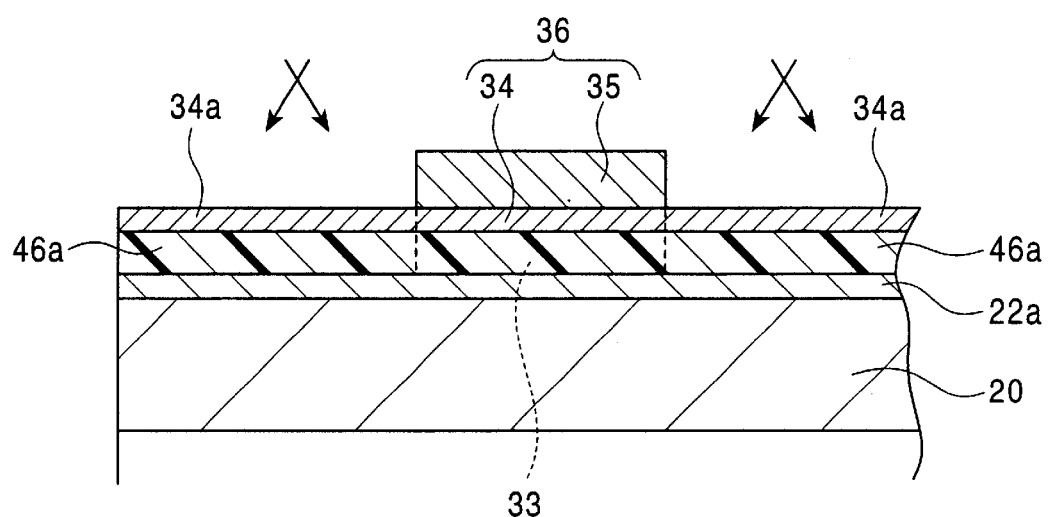
FIG. 28 is an explanatory view showing a step subsequent to the step shown in FIG. 27.

FIGS. 26 to 28 are process views showing a production method for the gap-depth defining layer 33 and the metal film 36 shown in FIG. 8.

In a step shown in FIG. 26, a seed layer 22a is formed on a lower core layer 20 by sputtering, and a resist material layer 46 made of ultraviolet curing resin or the like is then formed on the seed layer 22a. The resist material layer 46 of ultraviolet curing resin may be replaced with another organic material layer, or an inorganic material layer of $Al_2O_3$ or the like.

Subsequently, an underlying film 34 made of a nonmagnetic or magnetic metal material is formed over the entire surface of the resist material layer 46. It is preferable that the underlying film 34 be formed by sputtering. This allows the underlying film 34 to be suitably formed with a predetermined thickness over the entire resist material layer 46. It is preferable to select as the nonmagnetic metal material at least one of Cu, Au, Cu—Ni, Pt, and Ti, and to select as the magnetic metal material a NiFe alloy, a CoFe alloy, a CoFeNi alloy, or the like. It is preferable that the underlying film 34 have a thickness of 0.02 μm to 0.2 μm.

Subsequently, a resist layer 47 is formed on the underlying film 34, as shown in FIG. 26, and a hole 47a having a predetermined length in the height direction (Y-direction) is formed in the resist layer 47 at a predetermined distance from the recording-medium opposing surface in the height direction by exposure and development, so that the underlying film 34 is exposed through the hole 47a.

In a step shown in FIG. 27, a nonmagnetic metal film 35 is formed on the underlying film 34 exposed through the hole 47a by plating. By being formed by plating, the nonmagnetic metal film 35 can be made sufficiently thicker than the underlying film 34. It is preferable that the thickness of the nonmagnetic metal film 35 be set at 0.2 μm to 1.0 μm.

It is preferable that the nonmagnetic metal film 35 be made of at least one of nonmagnetic metal materials NiP, NiPd, NiW, NiMo, Au, Pt, Rh, Pd, Ru, Cr, and Ti.

When the nonmagnetic metal film 35 is made of a NiP alloy, continuous plating during production is easy, the heat resistance is high, and the adhesion to an upper magnetic layer 24 formed on the nonmagnetic metal film 35 is superior.

It is preferable that the nonmagnetic metal film 35 be made of a NiP alloy having a P concentration within the range of 8% by mass to 15% by mass. This allows the nonmagnetic metal film 35 to be stably kept nonmagnetic without being affected by external factors, for example, heat generation. The alloy composition of the nonmagnetic metal film 35 made of a NiP alloy or the like can be measured by, for example, an X-ray analyzer or a wavelength dispersive X-ray analysis system combined with an SEM, a TEM, or the like.

Then, the resist layer 47 is removed. FIG. 28 shows that removed state. Subsequently, a portion 34a of the underlying film 34 which is not covered with the nonmagnetic metal film 35 is removed by ion milling or RIE with the nonmagnetic metal film 35 used as a mask, and a portion 46a of the resist material layer 46 which is not covered with the nonmagnetic metal film 35 and is exposed due to the removal of the underlying film 34a is removed. As a result, the underlying film 34 and a gap-depth defining layer 33 of substantially rectangular cross section remain under the nonmagnetic metal film 35. The longitudinal cross section of the gap-depth defining layer 33 may be substantially trapezoidal.

Figure 29:
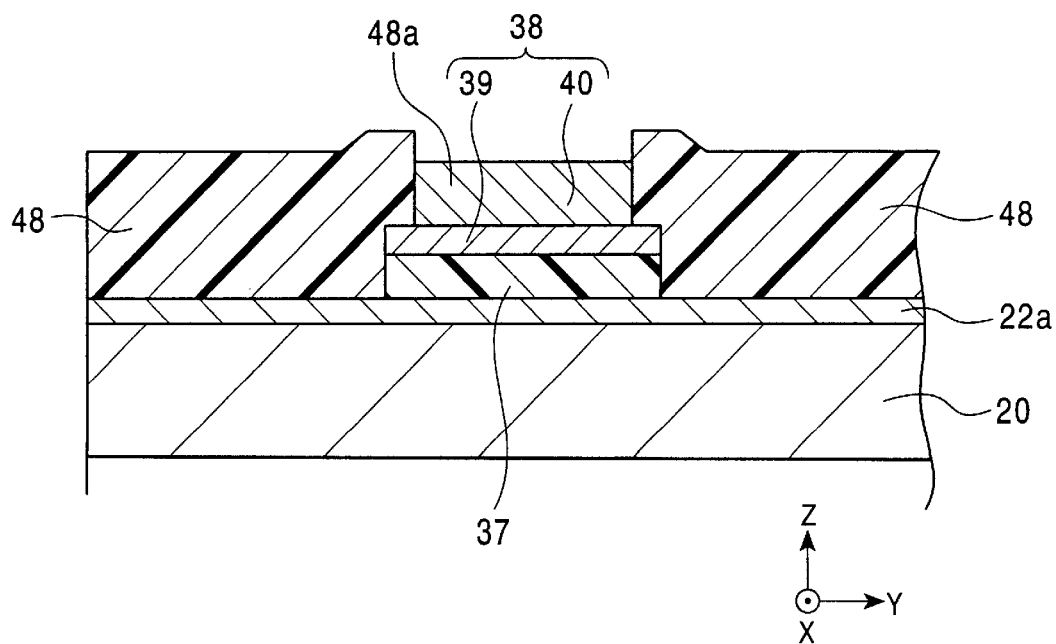
FIG. 29 is an explanatory view showing a step in a production method for the thin-film magnetic head shown in FIG. 9.
Figure 30:
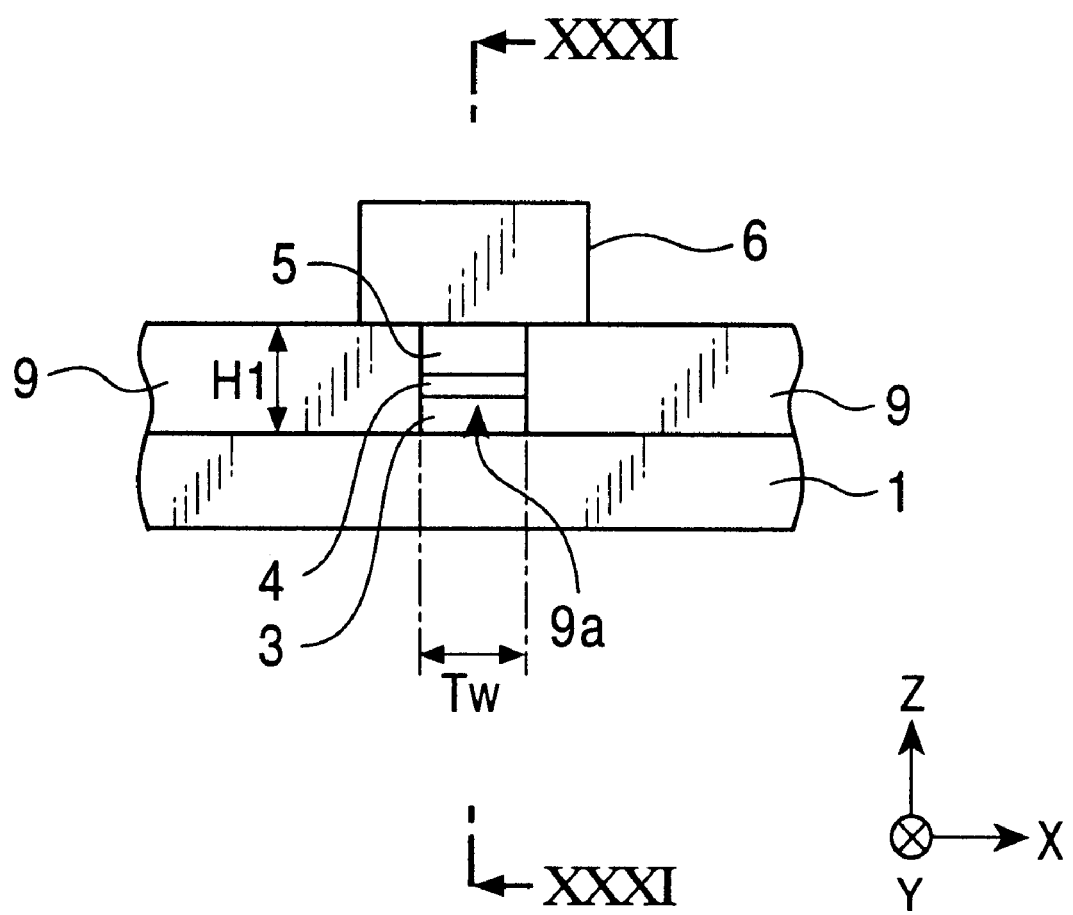
FIG. 30 is a partial front view showing the structure of a thin-film magnetic head as a related art.
Figure 31:
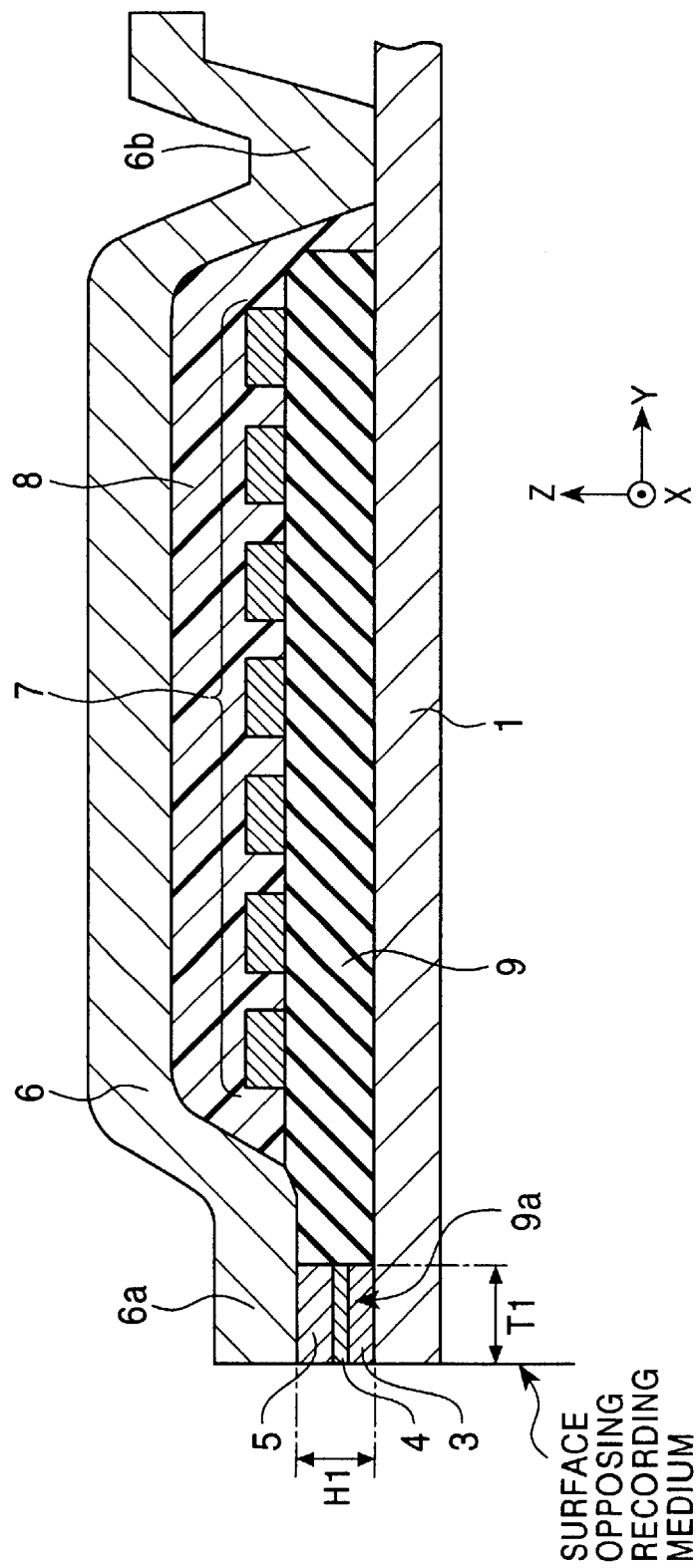
FIG. 31 is a partial longitudinal sectional view of the thin-film magnetic head, taken along line XXXI—XXXI in FIG. 30.
Figure 32:
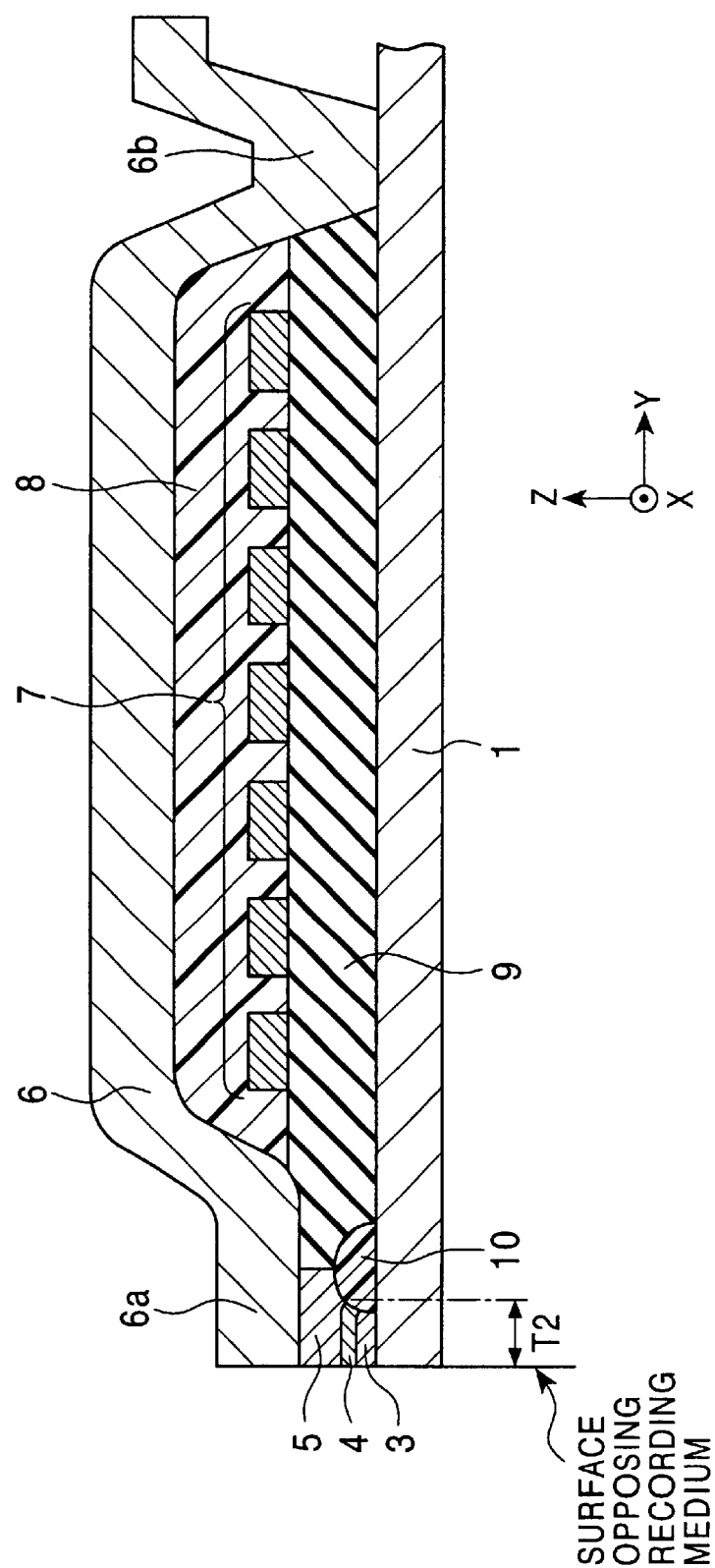
FIG. 32 is a partial longitudinal sectional view of another thin-film magnetic head as a related art.
Figure 33:
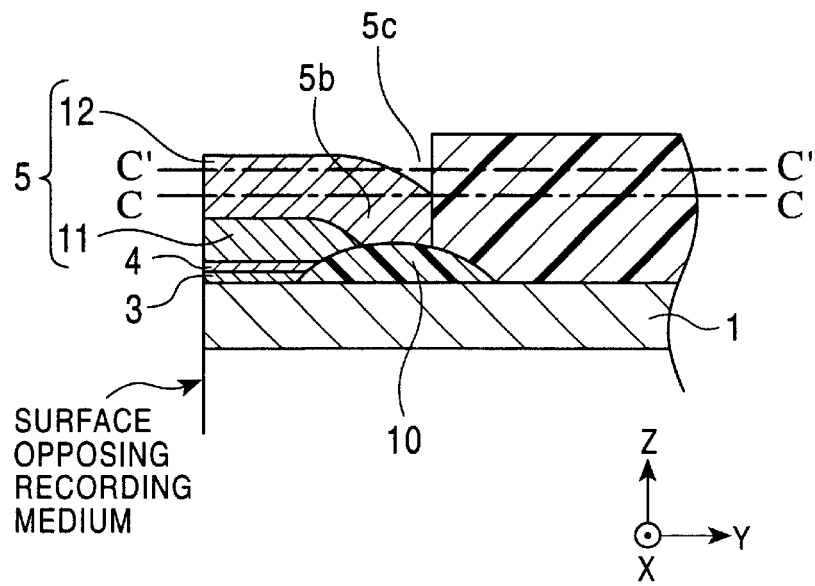
FIG. 33 is an explanatory view showing a step in a production method for the thin-film magnetic head shown in FIG. 32.
Figure 34:
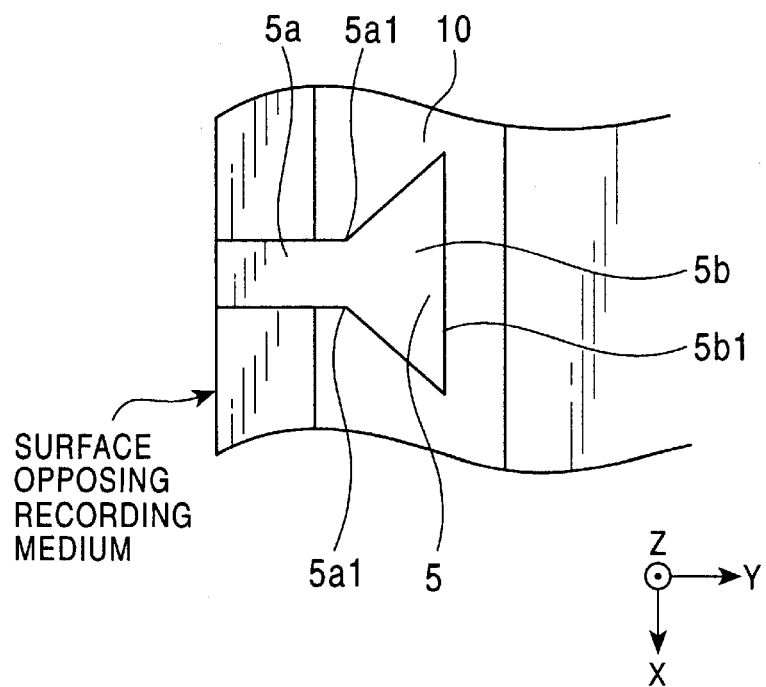
FIG. 34 is a partial plan view of an upper magnetic layer in the thin-film magnetic head shown in FIG. 32.

The gap-depth defining layer 37 and the metal film 40 shown in FIG. 9 can be formed through a step shown in FIG. 29.

By performing the same steps as those shown in FIGS. 21 to 24, a gap-depth defining layer 37 and an underlying film 39 forming a metal film 38 are formed on a seed layer 22a disposed on a lower core layer 20.

Next, a resist layer 48 is formed over the underlying film 39 and the seed layer 22a, and a hole 48a is formed in the resist layer 48 disposed on the underlying film 39 by exposure and development. The length in the height direction of the hole 48a is set to be less than the length in the height direction of the underlying film 39. Subsequently, a nonmagnetic metal film 40 is formed in the hole 48a by plating, and the resist layer 48 is then removed. As a result, the gap-depth defining layer 37 and the metal film 40 shown in FIG. 9 can be formed.

In the thin-film magnetic head produced by the production method shown in FIGS. 26 to 29 (see FIG. 8), it is preferable that the thickness of the gap-depth defining layer 33 or 37 be reduced to approximately 0.4 μm. This makes it possible to prevent the resist from accumulating between the front end face of the gap-depth defining layer 33 or 37 and the lower core layer 20, and to suitably form the lower magnetic layer 22, the gap layer 23, and the upper magnetic layer 24 on the lower core layer 20 by plating. In the production methods shown in FIGS. 28 and 29, even when the thickness of the gap-depth defining layer 33 or 37 is small, the distance between the upper magnetic layer 24 and the lower core layer 20 opposing with the gap-depth defining layer 33 or 37 therebetween can be increased because of the existence of the thick nonmagnetic metal film 35 or 40. This can prevent the magnetic field from leaking between the upper magnetic layer 24 and the lower core layer 20. It is preferable that the underlying film 34 or 39 constituting the metal film be formed by sputtering a nonmagnetic metal material. This can prevent the magnetic field from leaking between the underlying film 34 or 39 and the upper magnetic layer 24.

While the methods for forming, in particular, the gap-depth defining layer, the metal film, and the pole section in the thin-film magnetic head of the present invention have been described above with reference to FIGS. 12 to 29, the present invention allows the metal film to be easily and reliably formed on the gap-depth defining layer.

The metal film can be prevented from being formed at least on the front end face of the gap-depth defining layer, and the lower magnetic layer can be easily joined to the front end face.

Since the upper magnetic layer can be formed over the gap layer and the metal film by plating, the thickness of the upper magnetic layer on the gap-depth defining layer can be increased.

Since the upper magnetic layer 24 can be formed with a predetermined thickness, it is possible to produce a thin-film magnetic head which can prevent magnetic saturation. The positions of the rear edge (magnetic pole edge) 24d1 and the end portion 24c1, from which the upper magnetic layer 24 increases in width in the height direction, of the upper magnetic layer 24 shown in FIG. 4 may be freely designed and changed in order to optimize the overwriting characteristic depending on the position of the rear edge 24d1 and NLTS and the pulse width at the 50% threshold depending on the end portion 24c1. This increases the degree of flexibility in design.

The lower magnetic layer 22 is formed on the lower core layer 20 by plating, but is not formed by cutting the lower core layer 20, as in the related art shown in FIG. 35. Therefore, magnetic powder will not adhere onto both side faces in the track width direction of the upper magnetic layer 24. Consequently, trimming for removing the magnetic powder is unnecessary, and the controllability of the track width can be enhanced.

A thin-film magnetic head which can respond to a narrower track width can be produced by reducing the width in the track width direction of the upper magnetic layer 24 (track width Tw) by etching both side faces of the pole section constituted by the lower magnetic layer 22, the gap layer 23, and the upper magnetic layer 24 by ion milling after removing the resist layer 41 in the state shown in FIG. 17. Preferably, the track width Tw is set to be 0.7 μm or less, more preferably, 0.4 μm or less.

When the width in the track width direction of the pole-section forming groove 41a formed in the resist layer 41 during the step shown in FIG. 15 is 0.7 μm or less, more preferably, 0.4 μm or less, the width in the track width direction of the upper magnetic layer 24 (track width Tw) can be made 0.7 μm or less, more preferably, 0.4 μm or less. Therefore, it is possible to produce a thin-film magnetic head which can respond to a narrower track width, without performing ion milling.

As described in detail above, according to the present invention, the lower magnetic layer is formed on the lower core layer by plating so that it extends between the recording-medium opposing surface and the front end face of the gap-depth defining layer, and the metal film is formed on the gap-depth defining layer disposed behind the contact face between the lower magnetic layer and the gap-depth defining layer in the height direction.

Therefore, the upper magnetic layer can be suitably formed over the gap layer formed on the lower magnetic layer and the metal film, and the thickness of the upper magnetic layer on the gap-depth defining layer can be set at a predetermined value.

Furthermore, the volume of the upper magnetic layer can be sufficiently increased, and magnetic saturation in the upper magnetic layer can be properly reduced even when the recording density increases in future.

Since the upper magnetic layer of a predetermined thickness can be formed on the metal film formed on the gap-depth defining layer by plating, it is possible to increase the degree of flexibility in designing the positions of the rear edge and the end portion, from which the upper magnetic layer increases in width in the height direction, of the upper magnetic layer, and to enhance the overwriting characteristic, NLTS, and to increase the pulse width at the 50% threshold.

Since the lower magnetic layer is formed by plating, it is not necessary to perform the step of removing magnetic powder adhering to the side faces of the upper magnetic layer in the track width direction which is needed when the lower magnetic layer is formed by cutting the lower core layer, as in the related art. This can enhance the controllability of the track width.

Preferably, the upper magnetic layer has a layered structure in which two or more magnetic layers are stacked, and is formed by plating, the lowermost layer of the magnetic layers which is in contact with the gap layer is made of a high-Bs layer having a higher saturation magnetic flux density than those of the other magnetic layers, and the high-Bs layer is formed over the gap layer and the metal film by plating.

In the present invention, since the lowermost layer having a high saturation magnetic flux density (high-Bs layer) is formed onto the metal film formed on the gap-depth defining layer, the thickness thereof on the gap-depth defining layer can be made large, the magnetic flux flowing from the upper core layer to the upper magnetic layer can be properly guided to the high-Bs layer disposed on the gap-depth defining layer which constitutes the upper magnetic layer, and the flow efficiency of the magnetic flux can be enhanced. Therefore, the leakage field adjacent to the gap can be increased, compared with the related art. Consequently, it is possible to produce a thin-film magnetic head which can suitably respond to future increases in recording density.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A thin-film magnetic head comprising:

a lower core layer;

a magnetic pole section including a lower magnetic layer, a gap layer, and an upper magnetic layer stacked in that order on said lower core layer, said upper magnetic layer having a width in a track width direction less than that of said lower core layer so as to determine a track width; and an upper core layer formed on said upper magnetic layer, wherein a gap-depth defining layer is formed on a portion of said lower core layer behind a surface opposing a recording medium in a height direction, said lower magnetic layer extends from said opposing surface to a front end face of said gap-depth defining layer on a side of said opposing surface, a metal film is formed on a portion of said gap-depth defining layer disposed behind a contact face between said lower magnetic layer and said gap-depth defining layer in the height direction, said gap layer is formed on said lower magnetic layer so as to be in contact with at least said gap-depth defining layer, and said upper magnetic layer extends over said gap layer and said metal film.

2. A thin-film magnetic head according to claim 1, wherein said upper magnetic layer has a layered structure comprises at least two magnetic layers, a lowermost layer of said magnetic layers in contact with said gap layer is formed of a high-Bs layer having a higher saturation magnetic density than those of the other magnetic layers, and said high-Bs layer is formed over said gap layer and said metal film.

3. A thin-film magnetic head according to claim 1, wherein said front end face of said gap-depth defining layer is one of a curved face and an inclined face which is inclined in the height direction away from said lower core layer toward said upper core layer.

4. A thin-film magnetic head according to claim 3, wherein a cross section of said gap-depth defining layer in the height direction is substantially semielliptical.

5. A thin-film magnetic head according to claim 3, wherein a cross section of said gap-depth defining layer in the height direction is substantially trapezoidal.

6. A thin-film magnetic head according to claim 1, wherein said front end face of said gap-depth defining layer is a vertical face which vertically rises from said lower core layer toward said upper core layer.

7. A thin-film magnetic head according to claim 1, wherein said gap-depth defining layer is made of an organic material.

8. A thin-film magnetic head according to claim 7, wherein said gap-depth defining layer is made of a resist material.

9. A thin-film magnetic head according to claim 1, wherein said gap-depth defining layer is made of an inorganic material.

10. A thin-film magnetic head according to claim 1, wherein said metal film is made of a nonmagnetic metal material.

11. A thin-film magnetic head according to claim 10, wherein at least one of Au, Cu, Cu—Ni, Pt, and Ti is selected as said nonmagnetic metal material.

12. A thin-film magnetic head according to claim 10, wherein said metal film made of said nonmagnetic metal material is formed by sputtering.

13. A thin-film magnetic head according to claim 10, wherein said metal film is formed by placing a nonmagnetic metal film on an underlying film made of said nonmagnetic metal material.

14. A thin-film magnetic head according to claim 13, wherein said nonmagnetic metal film is made of at least one of NiP, NiPd, NiW, NiMo, Au, Pt, Rh, Pd, Ru, Cr, and Ti.

15. A thin-film magnetic head according to claim 1, wherein said metal film is made of a magnetic metal material.

16. A thin-film magnetic head according to claim 15, wherein said metal film made of said magnetic metal material is formed by sputtering.

17. A thin-film magnetic head according to claim 15, wherein said metal film is formed by placing a nonmagnetic metal film on an underlying film made of said magnetic metal material.

18. A thin-film magnetic head according to claim 17, wherein said nonmagnetic metal film is made of at least one of NiP, NiPd, NiW, NiMo, Au, Pt, Rh, Pd, Ru, Cr, and Ti.

19. A thin-film magnetic head according to claim 1, wherein said magnetic pole section comprises two layers, said gap layer and said upper magnetic layer, and said gap layer is formed on said lower core layer so as to extend between said opposing surface and said front end face of said gap-depth defining layer.

20. A thin-film magnetic head according to claim 1, wherein said gap layer extends from said opposing surface onto at least a part of said metal film formed on said gap-depth defining layer, and said upper magnetic layer is formed on said gap layer placed on said metal film.

21. A thin-film magnetic head according to claim 1, wherein said gap layer is made of a nonmagnetic metal material.

22. A thin-film magnetic head according to claim 21, wherein at least one of NiP, NiPd, NiW, NiMo, Au, Pt, Rh, Pd, Ru, Cr, and Ti is selected as said nonmagnetic metal material.

* * * * *